(12) United States Patent
Wu et al.

(10) Patent No.: US 11,985,605 B2
(45) Date of Patent: May 14, 2024

(54) METHOD AND DEVICE IN NODES USED FOR WIRELESS COMMUNICATION

(71) Applicants: Keying Wu, Shanghai (CN); Xiaobo Zhang, Shanghai (CN)

(72) Inventors: Keying Wu, Shanghai (CN); Xiaobo Zhang, Shanghai (CN)

(73) Assignee: SHANGHAI LANGBO COMMUNICATION TECHNOLOGY COMPANY LIMITED, Shanghai (CN)

(*) Notice: Subject to any disclaimer, the term of this patent is extended or adjusted under 35 U.S.C. 154(b) by 314 days.

(21) Appl. No.: 17/676,258

(22) Filed: Feb. 21, 2022

(65) Prior Publication Data

US 2022/0191806 A1 Jun. 16, 2022

Related U.S. Application Data

(63) Continuation of application No. PCT/CN2020/108641, filed on Aug. 12, 2020.

(30) Foreign Application Priority Data

Aug. 22, 2019 (CN) .......................... 201910780710.3
May 29, 2020 (CN) .......................... 202010475194.6

(51) Int. Cl.
*H04W 52/24* (2009.01)
*H04L 5/00* (2006.01)
(Continued)

(52) U.S. Cl.
CPC ......... *H04W 52/242* (2013.01); *H04L 5/0048* (2013.01); *H04W 4/40* (2018.02); *H04W 24/08* (2013.01); *H04W 52/38* (2013.01)

(58) Field of Classification Search
CPC ... H04B 7/0617; H04L 5/0023; H04L 5/0048; H04L 5/0051; H04W 24/08; H04W 4/40;
(Continued)

(56) References Cited

U.S. PATENT DOCUMENTS

2016/0157185 A1  6/2016  Chae
2021/0021394 A1*  1/2021  Wu .................. H04W 72/0446
(Continued)

FOREIGN PATENT DOCUMENTS

CN  108616840 A  10/2018
CN  109088663 A  12/2018
(Continued)

OTHER PUBLICATIONS

ISR received in application No. PCT/CN2020/108641 dated Nov. 17, 2020.
(Continued)

*Primary Examiner* — Tan H Trinh

(57) ABSTRACT

A method and a device in a node used for wireless communications. A first node receives K first-type reference signals; and transmits a first signal. A transmit power for the first signal is a first power value, a first reference power value is used to determine the first power value, and the first reference power value is linear with a first pathloss. A measurement on a first reference signal is used to determine the first pathloss, the first reference signal being one of the K first-type reference signals; a first index is related to at least a transmission antenna port for the first signal, and is used for determining the first reference signal out of the K first-type reference signals. The method above ensures a more accurate estimation of the interference sidelink transmission has caused to the cellular networks, thus improving the sidelink transmission performance and resource utilization.

20 Claims, 5 Drawing Sheets

(51) Int. Cl.
    *H04W 4/40*    (2018.01)
    *H04W 24/08*   (2009.01)
    *H04W 52/38*   (2009.01)

(58) Field of Classification Search
    CPC . H04W 52/242; H04W 52/38; H04W 52/383;
                                H04W 52/42; H04W 92/18
    USPC ........................................................ 455/522
    See application file for complete search history.

(56) References Cited

U.S. PATENT DOCUMENTS

| | | | | |
|---|---|---|---|---|
| 2021/0045062 A1* | 2/2021 | Ryu | ................. | H04L 5/0051 |
| 2021/0051643 A1* | 2/2021 | Jiang | ................. | H04B 7/0426 |
| 2021/0167916 A1* | 6/2021 | Jiang | ................. | H04W 24/10 |
| 2023/0379124 A1* | 11/2023 | Wu | ................. | H04L 5/0053 |

FOREIGN PATENT DOCUMENTS

| | | |
|---|---|---|
| CN | 109151969 A | 1/2019 |
| CN | 109803362 A | 5/2019 |

OTHER PUBLICATIONS

CN202010475194.6 First Office Action dated Aug. 4, 2021.
CN202010475194.6 First Search Report dated Jun. 26, 2021.
CN202010475194.6 Second Office Action dated Nov. 1, 2021.
LG Electronics "3GPP TSG RAN WG1 Meeting #97 R1-1907018" Discussion on physical layer procedures for NR sidelink May 17, 2019(May 17, 2019).
Samsung. "3GPP TSG RAN WGI #96bis R1-1904434" On Sidelink CSI. Apr. 12, 2019 (Apr. 12, 2019).

* cited by examiner

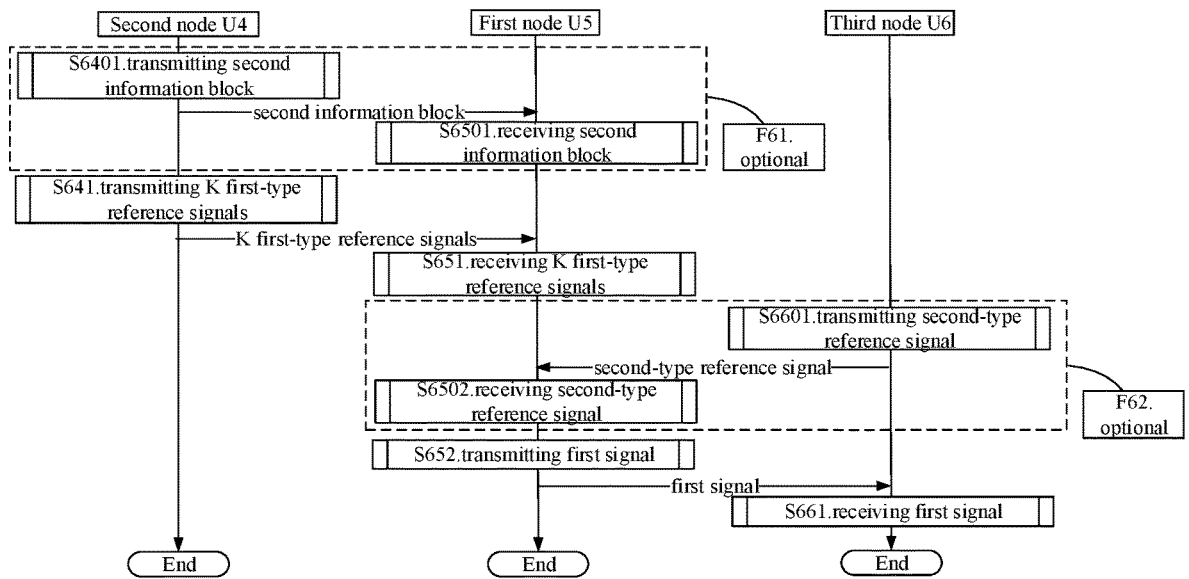

FIG. 6 first reference power value ∝ first coefficient × first pathloss

FIG. 7 first index ←── related to ──→ transmission antenna port for first signal

FIG. 8 second reference power value ∝ second coefficient × second pathloss

FIG. 9 first power value = min(first reference power value, first power threshold)

FIG. 10 first power value = min(first reference power value, second reference power value)

FIG. 11 first power value = min(first reference power value,
second reference power value, first power threshold)

FIG. 12 first power value = min(first reference power value, second reference power value, first power threshold, second power threshold)

FIG. 13

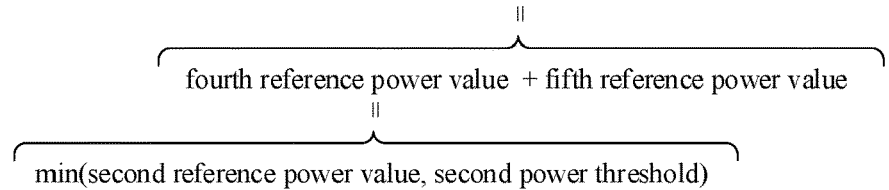

FIG. 14 first information block —indicating→ first channel quality

FIG. 15 first index ←associated with→ first reference signal

FIG. 16 first index —indicating→ second reference signal ←associated with→ first reference signal

FIG. 17 second information block —indicating→ Configuration information for each of K first-type reference signals

FIG. 18

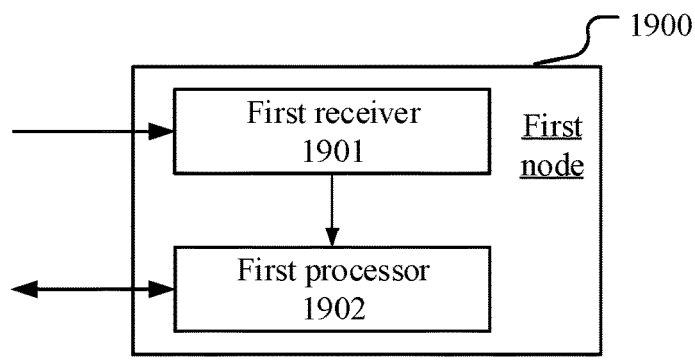

FIG. 19

METHOD AND DEVICE IN NODES USED FOR WIRELESS COMMUNICATION

CROSS REFERENCE TO RELATED APPLICATIONS

This application is the continuation of International Patent Application No. PCT/CN2020/108641, filed on Aug. 12, 2020, which claims the priority benefit of Chinese Patent Application No. 202010475194.6, filed on May 29, 2020, and the priority benefit of Chinese Patent Application No. 201910780710.3, filed on Aug. 22, 2019, the full disclosure of which is incorporated herein by reference.

BACKGROUND

Technical Field

The present disclosure relates to transmission methods and devices in wireless communication systems, and in particular to a sidelink-related transmission method and device in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary decided to conduct the study of New Radio (NR), or what is called fifth Generation (5G). The work Item (WI) of NR was approved at the 3GPP RAN #75 session to standardize the NR.

In response to rapidly growing Vehicle-to-Everything (V2X) traffics, the 3GPP started its work of standards setting and studies around the NR framework. At present, the 3GPP has finished regulations of requirements targeting the 5G V2X traffics which are included in the TS 22.886. The 3GPP defined 4 typical Use Case Groups for the 5G V2X traffics, which are as follows: Vehicles Platooning, Extended Sensors, Advanced Driving and Remote Driving. And a study of V2X technologies based on NR was already initiated by the 3GPP at the RAN #80 Plenary.

SUMMARY

Compared with the existing Long-term Evolution (LTE) V2X system, the NR V2X has a significant feature of supporting unicast and power control based on the pathloss in sidelink. As concluded at the 3GPP RAN1 #97 session, when a node is configured with power control based on pathlosses in the downlink and sidelink, this node will select a minimum value between two power values obtained respectively according to the above configuration methods. A technical feature of the NR system is to support beam-based power control. Then how to achieve V2X power control on the foundation of beam-based power control becomes an urgent issue to be handled.

To address the above issue, the present disclosure provides a solution. It should be noted that if no conflict is incurred, embodiments in any node in the present disclosure and the characteristics of the embodiments are also applicable to any other node, and vice versa. What's more, the embodiments in the present disclosure and the characteristics in the embodiments can be arbitrarily combined if there is no conflict.

The present disclosure provides a method in a first node for wireless communications, comprising:
  receiving K first-type reference signals, K being a positive integer greater than 1; and
  transmitting a first signal;
  herein, a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/ transmission antenna ports for the first signal, the first index being used to determine the first reference signal out of the K first-type reference signals; a transmitter for the K first-type reference signals is different from a target receiver for the first signal.

In one embodiment, a problem to be solved in the present disclosure includes: how a node should choose a downlink reference signal for sidelink power control when configured with multiple downlink reference signals used for pathloss estimation on a cellular link. As a solution, the method is proposed to choose the downlink reference signal for sidelink power control according to spatial domain information employed by the sidelink transmission.

In one embodiment, characteristics of the above method include: the K first-type reference signals are downlink reference signals, the first signal is transmitted in the sidelink, the first index containing spatial domain information for the first signal; the spatial domain information for the first signal is used to determine a downlink reference signal out of the K first-type reference signals to be used for power control of the first signal.

In one embodiment, characteristics of the above method include: the first reference power value reflects a maximum transmit power that can be employed by the first signal in the case of restricted interference of the first signal to the cellular network.

In one embodiment, an advantage of the above method includes: by adopting a downlink reference signal which matches with a transmission beam for the first signal to measure the downlink pathloss, a more estimation can be made on the sidelink transmission interference to the cellular network; avoiding a reduction in the sidelink performance due to constraints on the transmit power in the sidelink caused by overestimation of the sidelink interference with the cellular network.

According to one aspect of the present disclosure, characterized in that a same spatial domain filter is used for transmitting the first signal and receiving the first reference signal.

According to one aspect of the present disclosure, characterized in comprising:
  operating a second-type reference signal;
  herein, a second reference power value is used to determine the first power value, the second reference power value being linear with a second pathloss; a measurement on the second-type reference signal is used to determine the second pathloss; the operation is transmitting, or the operation is receiving.

According to one aspect of the present disclosure, characterized in comprising:
receiving a first information block;
herein, the operation is transmitting; the first information block indicates a first channel quality, a measurement on the second-type reference signal is used to determine the first channel quality, the first channel quality being used to determine the second pathloss.

According to one aspect of the present disclosure, characterized in that the first reference signal is associated with the first index.

According to one aspect of the present disclosure, characterized in that the first index indicates a second reference signal, the second reference signal being associated with the first reference signal; a target receiver for the second reference signal includes a transmitter for the K first-type reference signals.

According to one aspect of the present disclosure, characterized in comprising:
receiving a second information block;
herein, the second information block indicates configuration information for each of the K first-type reference signals.

According to one aspect of the present disclosure, characterized in that measurements on the K first-type reference signals are respectively used to determine K pathlosses, the K pathlosses being used to determine the transmission antenna port/transmission antenna ports for the first signal.

According to one aspect of the present disclosure, the first node is a UE.

According to one aspect of the present disclosure, the first node is a relay node.

The present disclosure provides a method in a second node for wireless communications, comprising:
transmitting K first-type reference signals, K being a positive integer greater than 1; and
herein, a measurement on a first reference signal is used to determine a first pathloss, the first reference signal being one of the K first-type reference signals; a first index is related to a transmission antenna port/transmission antenna ports for a first signal, a target receiver for the first signal is different from the second node; a transmit power for the first signal is a first power value, a first reference power value is used to determine the first power value, the first reference power value being linear with the first pathloss; the first index is used to determine the first reference signal out of the K first-type reference signals.

According to one aspect of the present disclosure, characterized in that a same spatial domain filter is used for transmitting the first signal and receiving the first reference signal.

According to one aspect of the present disclosure, characterized in that the first reference signal is associated with the first index.

According to one aspect of the present disclosure, characterized in that the first index indicates a second reference signal, the second reference signal being associated with the first reference signal; a target receiver for the second reference signal includes the second node.

According to one aspect of the present disclosure, characterized in comprising:
transmitting a second information block;
herein, the second information block indicates configuration information for each of the K first-type reference signals.

According to one aspect of the present disclosure, characterized in that measurements on the K first-type reference signals are respectively used to determine K pathlosses, the K pathlosses being used to determine the transmission antenna port/transmission antenna ports for the first signal.

According to one aspect of the present disclosure, the second node is a base station.

According to one aspect of the present disclosure, the second node is a relay node.

The present disclosure provides a method in a third node for wireless communications, comprising:
receiving a first signal;
herein, a transmit power for the first signal is a first power value, a first reference power value is used to determine the first power value, and the first reference power value is linear with a first pathloss, a measurement on a first reference signal is used to determine the first pathloss, the first reference signal being a first-type reference signal of K first-type reference signals, K being a positive integer greater than 1; a first index is related to a transmission antenna port/transmission antenna ports for the first signal, the first index being used to determine the first reference signal out of the K first-type reference signals; a transmitter for the K first-type reference signals is different from the third node.

According to one aspect of the present disclosure, characterized in that a same spatial domain filter is used for transmitting the first signal and receiving the first reference signal.

According to one aspect of the present disclosure, characterized in comprising:
executing a second-type reference signal;
herein, a second reference power value is used to determine the first power value, the second reference power value being linear with a second pathloss; a measurement on the second-type reference signal is used to determine the second pathloss; the execution is receiving, or the execution is transmitting.

According to one aspect of the present disclosure, characterized in comprising:
transmitting a first information block;
herein, the execution is receiving; the first information block indicates a first channel quality, a measurement on the second-type reference signal is used to determine the first channel quality, the first channel quality being used to determine the second pathloss.

According to one aspect of the present disclosure, characterized in that the first reference signal is associated with the first index.

According to one aspect of the present disclosure, characterized in that the first index indicates a second reference signal, the second reference signal being associated with the first reference signal; a target receiver for the second reference signal includes a transmitter for the K first-type reference signals.

According to one aspect of the present disclosure, characterized in that measurements on the K first-type reference signals are respectively used to determine K pathlosses, the K pathlosses being used to determine the transmission antenna port/transmission antenna ports for the first signal.

According to one aspect of the present disclosure, the third node is a UE.

According to one aspect of the present disclosure, the third node is a relay node.

The present disclosure provides a first node for wireless communications, comprising:
- a first receiver, receiving K first-type reference signals, K being a positive integer greater than 1; and
- a first processor, transmitting a first signal;
- herein, a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/transmission antenna ports for the first signal, the first index being used to determine the first reference signal out of the K first-type reference signals; a transmitter for the K first-type reference signals is different from a target receiver for the first signal.

The present disclosure provides a second node for wireless communications, comprising:
- a first transmitter, transmitting K first-type reference signals, K being a positive integer greater than 1;
- herein, a measurement on a first reference signal is used to determine a first pathloss, the first reference signal being one of the K first-type reference signals; a first index is related to a transmission antenna port/transmission antenna ports for a first signal, a target receiver for the first signal is different from the second node; a transmit power for the first signal is a first power value, a first reference power value is used to determine the first power value, the first reference power value being linear with the first pathloss; the first index is used to determine the first reference signal out of the K first-type reference signals.

The present disclosure provides a third node for wireless communications, comprising:
- a second processor, receiving a first signal;
- herein, a transmit power for the first signal is a first power value, a first reference power value is used to determine the first power value, and the first reference power value is linear with a first pathloss, a measurement on a first reference signal is used to determine the first pathloss, the first reference signal being a first-type reference signal of K first-type reference signals, K being a positive integer greater than 1; a first index is related to a transmission antenna port/transmission antenna ports for the first signal, the first index being used to determine the first reference signal out of the K first-type reference signals; a transmitter for the K first-type reference signals is different from the third node.

In one embodiment, compared with the prior art, the present disclosure is advantageous in the following aspects:
- providing a more accurate estimation about the interference of sidelink transmission to the cellular network;
- avoiding a reduction in the sidelink performance due to constraints on the transmit power in the sidelink caused by overestimation of the sidelink interference with the cellular network;
- enhancing the transmission performance and resource utilization ratio in the sidelink.

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a flowchart of transmission according to one embodiment of the present disclosure.

FIG. 7 illustrates a schematic diagram of a first reference power value according to one embodiment of the present disclosure.

FIG. 8 illustrates a schematic diagram of a first index according to one embodiment of the present disclosure.

FIG. 9 illustrates a schematic diagram of a second reference power value according to one embodiment of the present disclosure.

FIG. 10 illustrates a schematic diagram of a first power value according to one embodiment of the present disclosure.

FIG. 11 illustrates a schematic diagram of a first power value according to one embodiment of the present disclosure.

FIG. 12 illustrates a schematic diagram of a first power value according to one embodiment of the present disclosure.

FIG. 13 illustrates a schematic diagram of a first power value according to one embodiment of the present disclosure.

FIG. 14 illustrates a schematic diagram of a first power value according to one embodiment of the present disclosure.

FIG. 15 illustrates a schematic diagram of a first information block according to one embodiment of the present disclosure.

FIG. 16 illustrates a schematic diagram of a first reference signal and a first index being associated according to one embodiment of the present disclosure.

FIG. 17 illustrates a schematic diagram of relations among a first index, a second reference signal and a first reference signal according to one embodiment of the present disclosure.

FIG. 18 illustrates a schematic diagram of a second information block according to one embodiment of the present disclosure.

FIG. 19 illustrates a structure block diagram of a processing device in a first node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
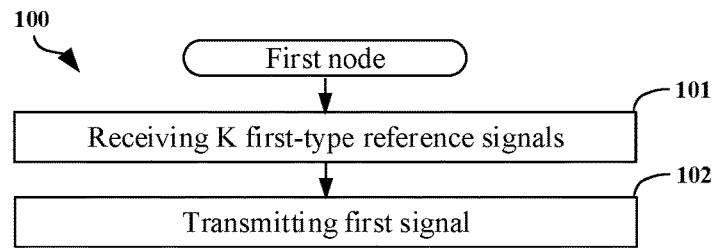
FIG. 1 illustrates a flowchart of K first-type reference signals and a first signal according to one embodiment of the present disclosure.

Embodiment 1 illustrates a flowchart of K first-type reference signals and a first signal according to one embodiment of the present disclosure, as shown in FIG. 1. In 100 illustrated by FIG. 1, each box represents a step. Particularly, the sequential step arrangement in each box herein does not imply a chronological order of steps marked respectively by these boxes.

In Embodiment 1, the first node in the present disclosure receives K first-type reference signals in step 101; and transmits a first signal in step 102. Herein, K is a positive integer greater than 1; a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/transmission antenna ports for the first signal, the first index being used to determine the first reference signal out of the K first-type reference signals; a transmitter for the K first-type reference signals is different from a target receiver for the first signal.

In one embodiment, the K first-type reference signals are DownLink (DL) reference signals.

In one embodiment, the K first-type reference signals comprise a Channel State Information-Reference Signal (CSI-RS).

In one embodiment, the K first-type reference signals comprise a None Zero Power (NZP) CSI-RS.

In one embodiment, the K first-type reference signals comprise a Synchronization Signal/Physical Broadcast CHannel block (SS/PBCH block).

In one embodiment, the K first-type reference signals comprise DeModulation Reference Signals (DMRS).

In one embodiment, the K first-type reference signals are transmitted via a Uu interface.

In one embodiment, the K first-type reference signals are transmitted in a DownLink.

In one embodiment, the K first-type reference signals are transmitted via a link between a base station and a UE.

In one embodiment, transmission antenna ports for any two first-type reference signals among the K first-type reference signals cannot be assumed to be Quasi Co-Located (QCL).

In one embodiment, any of the K first-type reference signals can be used for pathloss estimation in a V2X transmission.

In one embodiment, two antenna ports being QCL means that: large-scale properties of a channel which a radio signal transmitted by one of the two antenna ports goes through can be used to infer large-scale properties of a channel which a radio signal transmitted by the other of the two antenna ports goes through.

In one embodiment, the large-scale properties comprise one or more of {delay spread, Doppler spread, Doppler shift, average gain, average delay, Spatial Rx parameters}.

In one embodiment, the specific definition of the QCL can be found in 3GPP TS38.211, section 4.4.

In one embodiment, the first signal comprises a baseband signal.

In one embodiment, the first signal comprises a radio signal.

In one embodiment, the first signal is transmitted in the sidelink.

In one embodiment, the first signal is transmitted via a PC5 interface.

In one embodiment, the first signal is transmitted by unicast.

In one embodiment, the first signal is transmitted by groupcast.

In one embodiment, the first signal is transmitted by broadcast.

In one embodiment, the first signal carries a Transport Block (TB).

In one embodiment, the first signal carries a Code Block (CB).

In one embodiment, the first signal carries a Code Block Group (CBG).

In one embodiment, the K first-type reference signals are transmitted on a same carrier as the first signal.

In one embodiment, the K first-type reference signals are transmitted in a Downlink, while the first signal is transmitted in a sidelink.

In one embodiment, the first reference signal comprises a CSI-RS.

In one embodiment, the first reference signal comprises a NZP CSI-RS.

In one embodiment, the first reference signal comprises a SS/PBCH block.

In one embodiment, a same spatial domain filter is used for transmitting the first signal and receiving the first reference signal.

In one embodiment, the first index is a non-negative integer.

In one embodiment, the first index is a positive integer.

In one embodiment, the first index is used for identifying a Sounding Reference Signal (SRS) resource.

In one embodiment, the first index is used for identifying an SRS resource set.

In one embodiment, the first index is used for identifying an antenna group.

In one embodiment, an antenna group comprises a positive integer number of antenna(s), and different antenna groups comprise different antennas.

In one embodiment, different antenna groups are connected to a baseband processor through different Radio Frequency (RF) chains.

In one embodiment, the first index is used for identifying an antenna panel.

In one embodiment, an antenna panel comprises a positive integer number of antenna(s), and different antenna panels comprise different antennas.

In one embodiment, different antenna panels are connected to a baseband processor through different RF chains.

In one embodiment, the first index is used for identifying a spatialRelationInfo group, where such a spatialRelationInfo group comprises a positive integer number of piece(s) of spatial relation information.

In one embodiment, the specific definition of the spatialRelationInfo can be found in 3GPP TS38.331.

In one embodiment, the first index is used for identifying a downlink reference signal resource.

In one embodiment, the first index is used for identifying a downlink reference signal resource group, where a downlink reference signal resource group comprises a positive integer number of downlink reference signal resource(s).

In one subembodiment, the downlink reference signal resource comprises a CSI-RS resource.

In one subembodiment, the downlink reference signal resource comprises a SS/PBCH Block (SSB) resource.

In one embodiment, the first index is used for identifying a Transmission Configuration Indication (TCI) state group, where a TCI state group comprises a positive integer number of TCI state(s).

In one embodiment, the first index is used for identifying a TCI state.

In one embodiment, the specific definition of the TCI state can be found in 3GPP TS38.214 and 3GPP TS38.331.

In one embodiment, the first index comprises a Sounding reference signal Resource Indicator (SRI).

In one embodiment, the first index comprises a CSI-RS Resource indicator (CRI).

In one embodiment, the first index comprises a SSB Resource indicator (SSBRI).

In one embodiment, the first index comprises an SRS-ResourceId.

In one embodiment, the first index comprises an SRS-ResourceSetId.

In one embodiment, the first index comprises an NZP-CSI-RS-ResourceId.

In one embodiment, the first index comprises an NZP-CSI-RS-ResourceSetId.

In one embodiment, the first index comprises an SSB-Index.

In one embodiment, the first index comprises an SRI-PUSCH-PowerControlId.

In one embodiment, the specific definition of the SRS-ResourceId can be found in 3GPP TS38.331.

In one embodiment, the specific definition of the SRS-ResourceSetId can be found in 3GPP TS38.331.

In one embodiment, the specific definition of the NZP-CSI-RS-ResourceId can be found in 3GPP TS38.331.

In one embodiment, the specific definition of the NZP-CSI-RS-ResourceSetId can be found in 3GPP TS38.331.

In one embodiment, the specific definition of the SSB-Index can be found in 3GPP TS38.331.

In one embodiment, the specific definition of the SRI-PUSCH-PowerControlId can be found in 3GPP TS38.331.

In one embodiment, the first index is a first-type index; different uplink reference signals being associated with a same first-type index correspond to a same Timing Advance (TA).

In one embodiment, the first index is a first-type index; there are at least two different first-type indexes, uplink reference signals being respectively associated with these two first-type indexes correspond to different TAs.

In one embodiment, the first index is a first-type index; different uplink reference signals being associated with a same first-type index cannot be transmitted simultaneously.

In one embodiment, the first index is a first-type index; uplink reference signals associated with different first-type indexes can be transmitted simultaneously.

In one embodiment, the uplink reference signals comprise an SRS.

In one embodiment, the phrase of the first index being used to determine the first reference signal out of the K first-type reference signals comprises that: the first reference signal is a first-type reference signal associated with the first index among the K first-type reference signals.

In one embodiment, among the K first-type reference signals only the first reference signal is associated with the first index.

In one embodiment, the phrase of the first index being used to determine the first reference signal out of the K first-type reference signals comprises that: the first index indicates the second reference signal in the present disclosure, the second reference signal being associated with the first reference signal among the K first-type reference signals.

In one embodiment, the second reference signal is associated only with the first reference signal among the K first-type reference signals.

In one embodiment, the first index is used to determine a Redundancy Version (RV) of the first signal.

In one embodiment, the first index is used together with time-frequency resources occupied by the first signal for determining the first reference signal out of the K first-type reference signals.

In one embodiment, time-frequency resources occupied by the first signal belong to a first resource pool, the first resource pool being one of M candidate resource pools, where M is a positive integer greater than 1; The M candidate resource pools respectively correspond to M reference signal sets, any of the M reference signal sets comprises one or more reference signals of the K first-type reference signals; the first index is used to determine the first reference signal from a reference signal set corresponding to the first resource pool.

In one subembodiment, any of the M candidate resource pools is reserved for V2X transmission.

In one subembodiment, there is one candidate resource pool among the M candidate resource pools being reserved for V2X transmission.

In one subembodiment, there is one candidate resource pool among the M candidate resource pools being reserved for uplink transmission.

In one subembodiment, the M reference signal sets are configured by an RRC signaling.

In one subembodiment, the first reference signal is a reference signal associated with the first index in a reference signal set corresponding to the first resource pool.

In one subembodiment, the first reference signal is one and only reference signal associated with the first index in a reference signal set corresponding to the first resource pool.

In one embodiment, the priority of the first signal is used to determine the first reference signal.

In one embodiment, the priority of the first signal belongs to a first priority set, the first priority set being one of M priority sets, where M is a positive integer greater than 1; The M priority sets respectively correspond to M reference signal sets, any of the M reference signal sets comprises one or more reference signals of the K first-type reference signals; the first index is used to determine the first reference signal from a reference signal set corresponding to the first priority set.

In one subembodiment, the M priority sets are configured by an RRC signaling.

In one subembodiment, the first reference signal is one and only reference signal associated with the first index in a reference signal set corresponding to the first resource pool.

In one embodiment, among the K first-type reference signals there is a first-type reference signal belonging to two different reference signal sets among the M reference signal sets at the same time.

In one embodiment, among the K first-type reference signals there isn't a first-type reference signal belonging to two different reference signal sets among the M reference signal sets at the same time.

Embodiment 2

Figure 2:
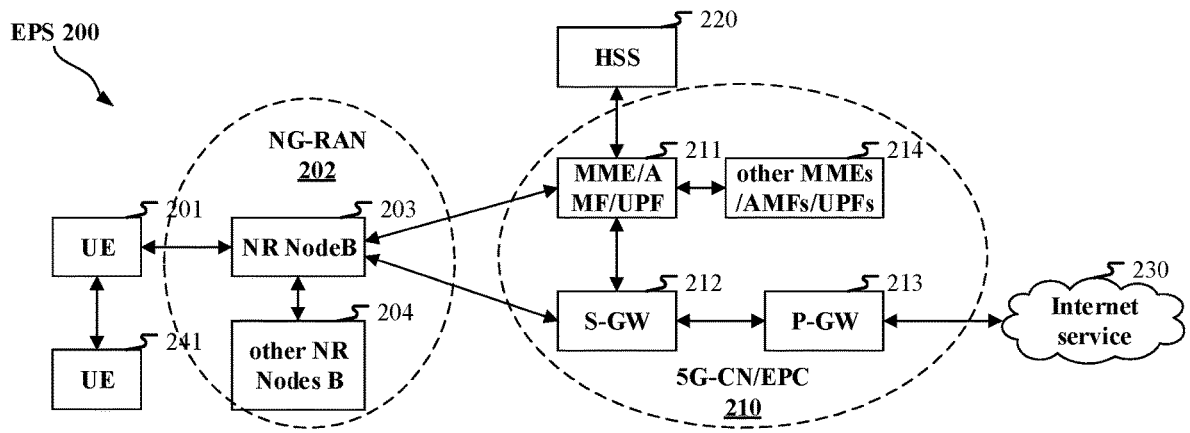
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture of Long-Term Evolution (LTE), Long-Term Evolution Advanced (LTE-A) and future 5G systems. The LTE, or LTE-A or future 5G network architecture 200 may be called an Evolved Packet System (EPS) 200. The EPS 200 may comprise one or more UEs 201, a UE 241 in sidelink communication with the UE(s) 201, an NG-RAN 202, a 5G-Core Network/Evolved Packet Core (5G-CN/EPC) 210, a Home Subscriber Server/Unified Data Management (HSS/UDM) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services. The NG-RAN 202 comprises a New Radio (NR) node B (gNB) 203 and other gNBs 204. The gNB 203 provides UE 201-oriented user plane and control plane protocol terminations. The gNB 203 may be connected to other gNBs 204 via an X2 interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5G-CN/EPC 210 for the UE 201. Examples of UE 201 include cellular phones, smart phones, Session Initiation Protocol (SIP) phones, laptop computers, Personal Digital Assistant (PDA), Satellite Radios, Global Positioning System (GPS), multimedia devices, video devices, digital audio players (for example, MP3 players), cameras, games consoles, unmanned aerial vehicles, air vehicles, narrow-band physical network equipment, machine-type communication equipment, land vehicles, automobiles, wearables, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5G-CN/EPC 210 via an S1 interface. The 5G-CN/EPC 210 comprises a Mobility Management Entity (MME)/Authentication Management Field (AMF)/User Plane Function (UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the 5G-CN/EPC 210. Generally, the MME/AMF/UPF 211 provides bearer and connection management. All user Internet Protocol (IP) packets are transmitted through the S-GW 212. The S-GW 212 is connected to the P-GW 213. The P-GW 213 provides UE IP address allocation and other functions. The P-GW 213 is connected to the Internet Service 230. The Internet Service 230 comprises IP services corresponding to operators, specifically including Internet, Intranet, IP Multimedia Subsystem (IMS) and Packet Switching (PS) services.

In one embodiment, the first node in the present disclosure includes the UE 201.

In one embodiment, the second node in the present disclosure includes the gNB 203.

In one embodiment, the third node in the present disclosure includes the UE 241.

In one embodiment, the third node in the present disclosure includes the UE 201.

In one embodiment, an air interface between the UE 201 and the gNB 203 is a Uu interface.

In one embodiment, a radio link between the UE 201 and the gNB 203 is a cellular link.

In one embodiment, an air interface between the UE 201 and the UE 241 is a PC5 interface.

In one embodiment, a radio link between the UE 201 and the UE 241 is a sidelink.

In one embodiment, the first node and the third node in the present disclosure are respectively terminals within the coverage of the gNB 203.

In one embodiment, the first node in the present disclosure is a terminal within the coverage of the gNB 203, and the third node in the present disclosure is a terminal out of the coverage of the gNB 203.

In one embodiment, unicast transmission is supported between the UE 201 and the UE 241.

In one embodiment, broadcast transmission is supported between the UE 201 and the UE 241.

In one embodiment, groupcast transmission is supported between the UE 201 and the UE 241.

In one embodiment, a transmitter for the K first-type reference signals in the present disclosure includes the gNB 203.

In one embodiment, a receiver for the K first-type reference signals in the present disclosure includes the UE 201.

In one embodiment, a transmitter for the first signal in the present disclosure includes the UE 201.

In one embodiment, a receiver for the first signal in the present disclosure includes the UE 241.

Embodiment 3

Figure 3:
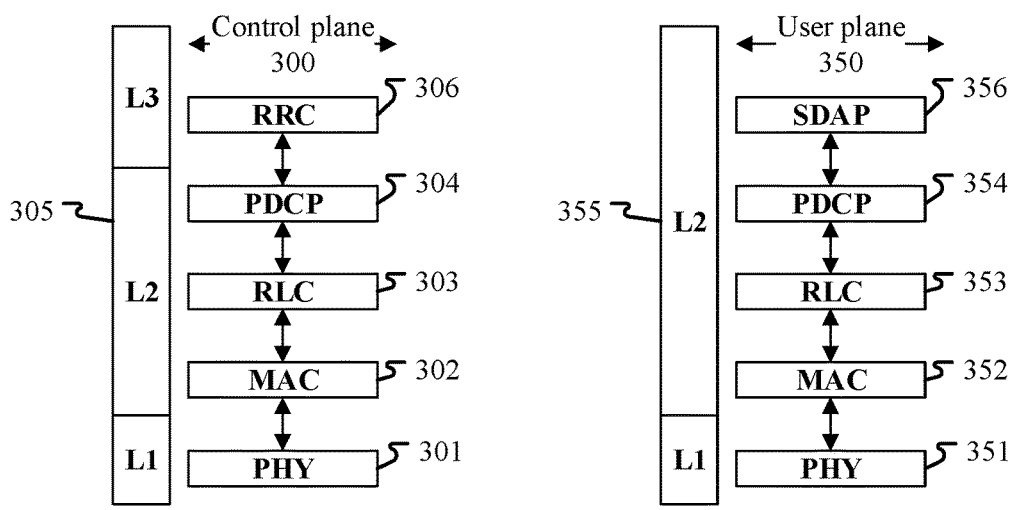
FIG. 3 illustrates a schematic diagram of a radio protocol architecture of a user plane and a control plane according to one embodiment of the present disclosure.

Embodiment 3 illustrates a schematic diagram of an example of a radio protocol architecture of a user plane and a control plane according to the present disclosure, as shown in FIG. 3.

Embodiment 3 illustrates a schematic diagram of a radio protocol architecture of a user plane and a control plane according to the present disclosure, as shown in FIG. 3. FIG. 3 is a schematic diagram illustrating an embodiment of a radio protocol architecture of a user plane 350 and a control plane 300. In FIG. 3, the radio protocol architecture for a control plane 300 between a first communication node (UE, gNB or, RSU in V2X) and a second communication node (gNB, UE, or RSU in V2X), or between two UEs, is represented by three layers, which are a layer 1, a layer 2 and a layer 3, respectively. The layer 1 (L1) is the lowest layer which performs signal processing functions of various PHY layers. The L1 is called PHY 301 in the present disclosure. The layer 2 (L2) 305 is above the PHY 301, and is in charge of the link between a first communication node and a second communication node as well as between two UEs via the PHY 301. The L2 305 comprises a Medium Access Control (MAC) sublayer 302, a Radio Link Control (RLC) sublayer 303 and a Packet Data Convergence Protocol (PDCP) sublayer 304. All these sublayers terminate at the second communication nodes. The PDCP sublayer 304 provides multiplexing among variable radio bearers and logical channels. The PDCP sublayer 304 provides security by encrypting packets and also support for inter-cell handover of the first communication node between second communication nodes. The RLC sublayer 303 provides segmentation and reassembling of a higher-layer packet, retransmission of a lost packet, and reordering of a packet so as to compensate the disordered receiving caused by Hybrid Automatic Repeat reQuest (HARQ). The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. In the control plane 300, The RRC sublayer 306 in the L3 layer is responsible for acquiring radio resources (i.e., radio bearer) and configuring the lower layer using an RRC signaling between the second communication node and the first communication node. The radio protocol architecture in the user plane 350 comprises the L1 layer and the L2 layer. In the user plane 350, the radio protocol architecture used for the first communication node and the second communication node in a PHY layer 351, a PDCP sublayer 354 of the L2 layer 355, an RLC sublayer 353 of the L2 layer 355 and a MAC sublayer 352 of the L2 layer 355 is almost the same as the radio protocol architecture used for corresponding layers and sublayers in the control plane 300, but the PDCP sublayer 354 also provides header compression used for higher-layer packet to reduce radio transmission overhead. The L2 layer 355 in the user plane 350 also comprises a Service Data Adaptation Protocol (SDAP) sublayer 356, which is in charge of the mapping between QoS streams and a Data Radio Bearer (DRB), so as to support diversified traffics. Although not described in FIG. 3, the first communication node may comprise several higher layers above the L2 355, such as a network layer (i.e., IP layer) terminated at a P-GW 213 of the network side and an application layer terminated at the other side of the connection (i.e., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the radio protocol architecture in FIG. 3 is applicable to the third node in the present disclosure.

In one embodiment, the K first-type reference signals are generated by the PHY 301, or the PHY 351.

In one embodiment, the first signal is generated by the PHY 301, or the PHY 351.

In one embodiment, the second-type reference signal is generated by the PHY 301, or the PHY 351.

In one embodiment, the first information block is generated by the PHY 301, or the PHY 351.

In one embodiment, the first information block is generated by the MAC sublayer 302, or the MAC sublayer 352.

In one embodiment, the second information block is generated by the MAC sublayer 302, or the MAC sublayer 352.

In one embodiment, the second information block is generated by the RRC sublayer 306.

Embodiment 4

Figure 4:
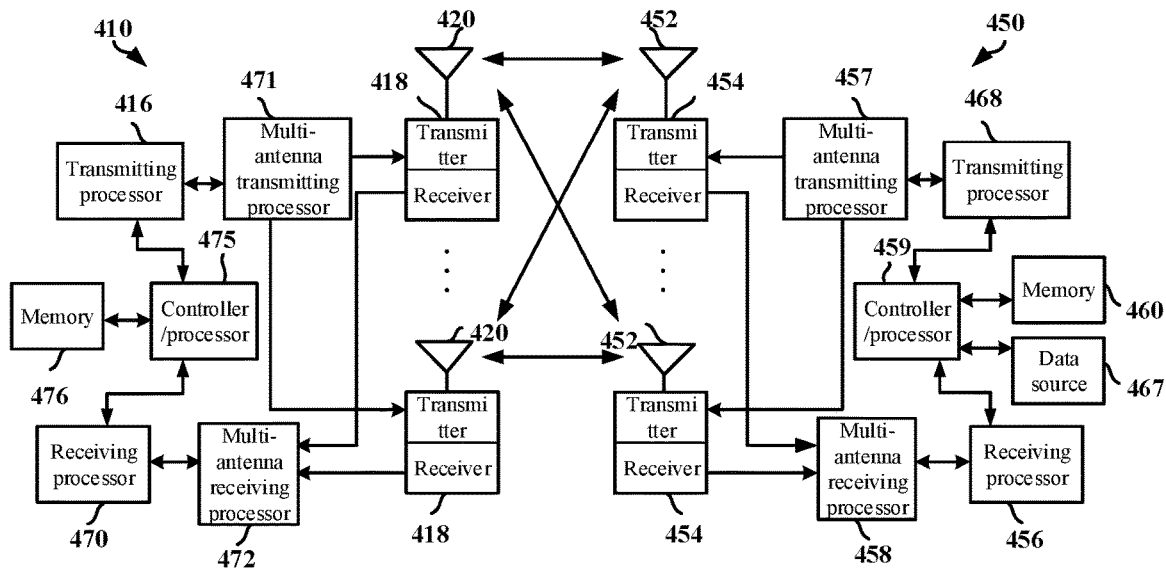
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 and a second communication device 450 in communication with each other in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from a core network is provided to the controller/processor 475. The controller/processor 475 provides functions of the L2 layer. In DL, the controller/processor 475 provides header compression, encryption, packet segmentation and reordering, multiplexing between a logical channel and a transport channel and radio resource allocation of the second communication device 450 based on various priorities. The controller/processor 475 is responsible for HARQ operation, retransmission of a lost packet and a signaling to the second communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 450 side and the constellation mapping corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more parallel streams. The transmitting processor 416 then maps each parallel stream into a subcarrier. The modulated symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted by the first communication device 410 on the physical channel. Next, the higher-layer data and control signal are provided to the controller/processor 459. The controller/processor 459 provides functions of the L2 layer. The controller/processor 459 can be associated with a memory 460 that stores program code and data. The memory 460 can be called a computer readable medium. In DL transmission, the controller/processor 459 provides de-multiplexing between a transport channel and a logical channel, packet reassembling, decryption, header decompression, control signal processing so as to recover a higher-layer packet from the core network. The higher-layer packet is later provided to all protocol layers above the L2 layer. Or various control signals can be provided to the L3 for processing. The controller/processor 459 is also in charge of using ACK and/or NACK protocols for error detection as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL, the controller/processor 459 performs header compression, encryption, packet segmentation and reordering, and multiplexing between a logical channel and a transport channel based on radio resource allocation for the first communication device 410 so as to provide the L2 layer functions used for the user plane and the control plane. The controller/processor 459 is responsible for HARQ operation, retransmission of a lost packet and a signaling to the first communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated parallel streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated with the memory 476 that stores program code and data. The memory 476 can be called a computer readable medium. The controller/processor 475 provides demultiplexing between a transport channel and a logical channel, packet reassembling, decryption, header decompression and control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication node 450 comprises at least one processor and at least one memory, the at least one memory comprises computer program codes; the at least one memory and the computer program codes are configured to be used in collaboration with the at least one processor. The second communication device 450 at least: receives the K first-type reference signals in the present disclosure; and transmits the first signal in the present disclosure; K is a positive integer greater than 1; a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/transmission antenna ports for the first signal, the first index being used to determine the first reference signal out of the K first-type reference signals; a transmitter for the K first-type reference signals is different from a target receiver for the first signal.

In one embodiment, the second communication node 450 comprises a memory that stores a computer readable instruction program, the computer readable instruction program generates actions when executed by at least one processor, which include: receiving the K first-type reference signals in the present disclosure; and transmitting the first signal in the present disclosure; K is a positive integer greater than 1; a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/transmission antenna ports for the first signal, the first index being used to determine the first reference signal out of the K first-type reference signals; a transmitter for the K first-type reference signals is different from a target receiver for the first signal.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: transmits the K first-type reference signals in the present disclosure, K being a positive integer greater than 1. A measurement on a first reference signal is used to determine a first pathloss, the first reference signal being one of the K first-type reference signals; a first index is related to a transmission antenna port/transmission antenna ports for a first signal, a target receiver for the first signal is different from the first communication device 410; a transmit power for the first signal is a first power value, a first reference power value is used to determine the first power value, the first reference power value being linear with the first pathloss; the first index is used to determine the first reference signal out of the K first-type reference signals.

In one embodiment, the first communication device 410 comprises a memory that stores a computer readable instruction program, the computer readable instruction program generates actions when executed by at least one processor, which include: transmitting the K first-type reference signals in the present disclosure, K being a positive integer greater than 1. A measurement on a first reference signal is used to determine a first pathloss, the first reference signal being one of the K first-type reference signals; a first index is related to a transmission antenna port/transmission antenna ports for a first signal, a target receiver for the first signal is different from the first communication device 410; a transmit power for the first signal is a first power value, a first reference power value is used to determine the first power value, the first reference power value being linear with the first pathloss; the first index is used to determine the first reference signal out of the K first-type reference signals.

In one embodiment, the first communication device 410 comprises at least one processor and at least one memory, the at least one memory comprises computer program codes; the at least one memory and the computer program codes are configured to be used in collaboration with the at least one processor. The first communication device 410 at least: receives the first signal in the present disclosure; a transmit power for the first signal is a first power value, a first reference power value is used to determine the first power value, and the first reference power value is linear with a first pathloss, a measurement on a first reference signal is used to determine the first pathloss, the first reference signal being a first-type reference signal of K first-type reference signals, K being a positive integer greater than 1; a first index is related to a transmission antenna port/transmission antenna ports for the first signal, the first index being used to determine the first reference signal out of the K first-type reference signals; a transmitter for the K first-type reference signals is different from the first communication device 410.

In one embodiment, the first communication device 410 comprises a memory that stores a computer readable instruction program, the computer readable instruction program generates actions when executed by at least one processor, which include: receiving the first signal in the present disclosure; a transmit power for the first signal is a first power value, a first reference power value is used to determine the first power value, and the first reference power value is linear with a first pathloss, a measurement on a first reference signal is used to determine the first pathloss, the first reference signal being a first-type reference signal of K first-type reference signals, K being a positive integer greater than 1; a first index is related to a transmission antenna port/transmission antenna ports for the first signal, the first index being used to determine the first reference signal out of the K first-type reference signals; a transmitter for the K first-type reference signals is different from the first communication device 410.

In one embodiment, the first node in the present disclosure comprises the second communication device 450.

In one embodiment, the second node in the present disclosure comprises the first communication device 410.

In one embodiment, the third node in the present disclosure comprises the first communication device 410.

In one embodiment, at least one of the antenna 452, the receiver 454, the receiving processor 456, the multi-antenna receiving processor 458, the controller/processor 459, the memory 460 or the data source 467 is used to receive the K first-type reference signals in the present disclosure; at least one of the antenna 420, the transmitter 418, the transmitting processor 416, the multi-antenna transmitting processor 471, the controller/processor 475 or the memory 476 is used to transmit the K first-type reference signals in the present disclosure.

In one embodiment, at least one of the antenna 420, the receiver 418, the receiving processor 470, the multi-antenna receiving processor 472, the controller/processor 475 or the memory 476 is used to receive the first signal in the present disclosure; at least one of the antenna 452, the transmitter 454, the transmitting processor 468, the multi-antenna transmitting processor 457, the controller/processor 459, the memory 460 or the data source 467 is used to transmit the first signal in the present disclosure.

In one embodiment, at least one of the antenna 452, the receiver 454, the receiving processor 456, the multi-antenna receiving processor 458, the controller/processor 459, the memory 460 or the data source 467 is used to receive the second-type reference signal in the present disclosure; at least one of the antenna 420, the transmitter 418, the transmitting processor 416, the multi-antenna transmitting processor 471, the controller/processor 475 or the memory 476 is used to transmit the second-type reference signal in the present disclosure.

In one embodiment, at least one of the antenna 420, the receiver 418, the receiving processor 470, the multi-antenna receiving processor 472, the controller/processor 475 or the memory 476 is used to receive the second-type reference signal in the present disclosure; at least one of the antenna 452, the transmitter 454, the transmitting processor 468, the multi-antenna transmitting processor 457, the controller/processor 459, the memory 460 or the data source 467 is used to transmit the second-type reference signal in the present disclosure.

In one embodiment, at least one of the antenna 452, the receiver 454, the receiving processor 456, the multi-antenna receiving processor 458, the controller/processor 459, the memory 460 or the data source 467 is used to receive the first information block in the present disclosure; at least one of the antenna 420, the transmitter 418, the transmitting processor 416, the multi-antenna transmitting processor 471, the controller/processor 475 or the memory 476 is used to transmit the first information block in the present disclosure.

In one embodiment, at least one of the antenna 452, the receiver 454, the receiving processor 456, the multi-antenna receiving processor 458, the controller/processor 459, the memory 460 or the data source 467 is used to receive the second information block in the present disclosure; at least one of the antenna 420, the transmitter 418, the transmitting processor 416, the multi-antenna transmitting processor 471, the controller/processor 475 or the memory 476 is used to transmit the second information block in the present disclosure.

Embodiment 5

Figure 5:
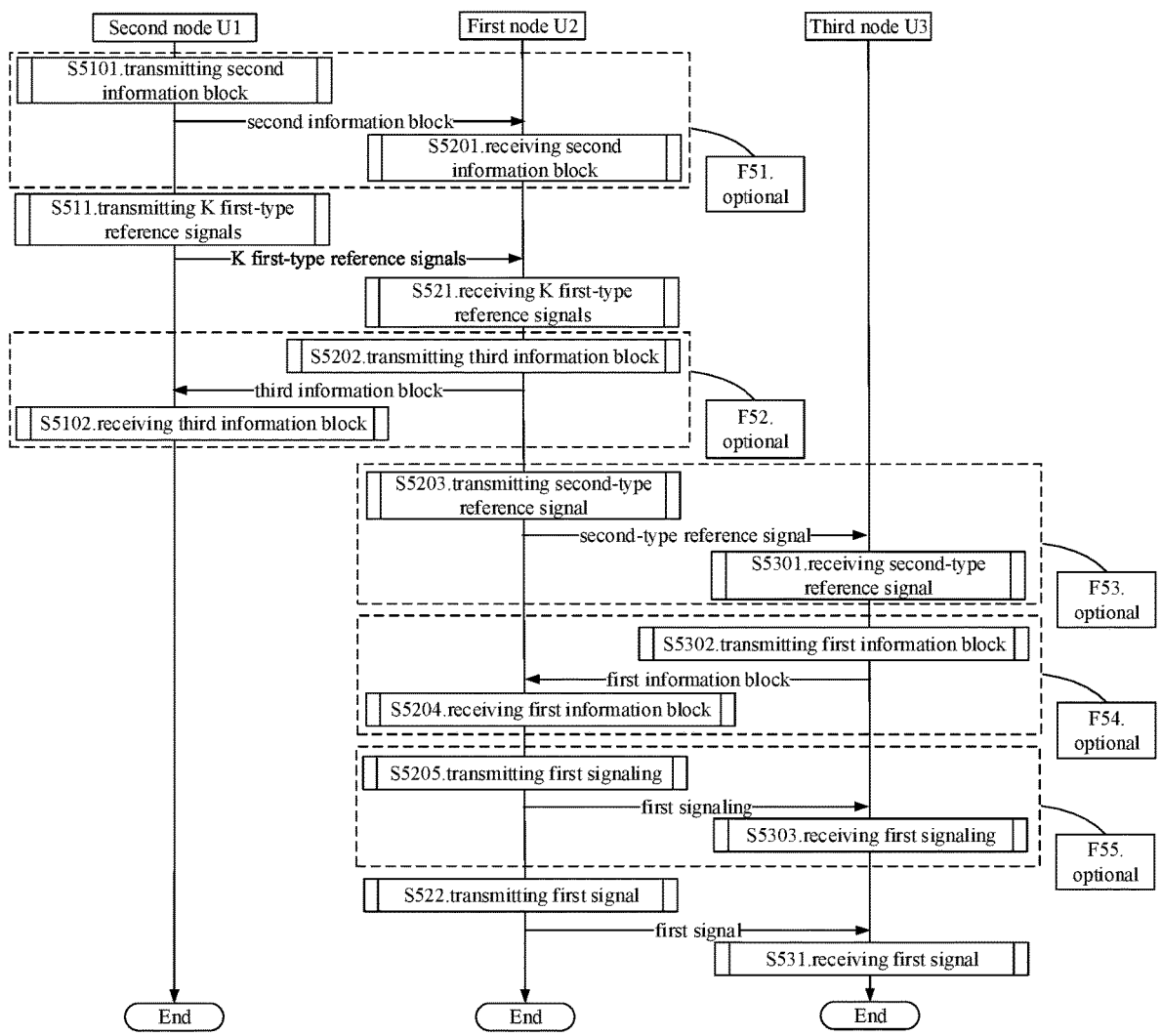
FIG. 5 illustrates a flowchart of transmission according to one embodiment of the present disclosure.

Embodiment 5 illustrates a flowchart of wireless transmission according to one embodiment of the present disclosure, as shown in FIG. 5. In FIG. 5, a second node U1, a first node U2 and a third node U3 are communication nodes that mutually transmit through air interfaces. In FIG. 5, steps marked by boxes F51 to F55 are optional, respectively.

The second node U1 transmits a second information block in step S5101; transmits K first-type reference signals in step S511; and receives a third information block in step S5102.

The first node U2 receives a second information block in step S5201; receives K first-type reference signals in step S521; and transmits a third information block in step S5202; transmits a second-type reference signal in step S5203; and receives a first information block in step S5204; transmits a first signaling in step S5205; and transmits a first signal in step S522.

The third node U3 receives a second-type reference signal in step S5301; transmits a first information block in step S5302; and receives a first signaling in step S5303; and receives a first signal in step S531.

In Embodiment 5, a transmit power for the first signal is a first power value, a first reference power value is used by the first node U2 to determine the first power value, and the first reference power value is linear with a first pathloss, a measurement on a first reference signal is used by the first node U2 to determine the first pathloss, the first reference signal being a first-type reference signal of the K first-type reference signals; a first index is related to a transmission antenna port/transmission antenna ports for the first signal, the first index being used by the first node U2 to determine the first reference signal out of the K first-type reference signals; a target receiver for the first signal does not include the second node U1.

In one embodiment, the first node U2 is the first node in the present disclosure.

In one embodiment, the second node U1 is the second node in the present disclosure.

In one embodiment, the third node U3 is the third node in the present disclosure.

In one embodiment, an air interface between the second node U1 and the first node U2 is a Uu interface.

In one embodiment, an air interface between the second node U1 and the first node U2 includes a cellular link.

In one embodiment, an air interface between the second node U1 and the first node U2 includes a radio interface between a base station and a UE.

In one embodiment, an air interface between the second node U1 and the first node U2 includes a radio interface between a relay node and a UE.

In one embodiment, an air interface between the third node U3 and the first node U2 is a PC5 interface.

In one embodiment, an air interface between the third node U3 and the first node U2 includes a sidelink.

In one embodiment, an air interface between the third node U3 and the first node U2 includes a radio interface between a relay node and a UE.

In one embodiment, an air interface between the third node U1 and the first node U2 includes a radio interface between a UE and another UE.

In one embodiment, the first node in the present disclosure is a terminal.

In one embodiment, the first node in the present disclosure is an automobile.

In one embodiment, the first node in the present disclosure is a vehicle.

In one embodiment, the first node in the present disclosure is a Road Side Unit (RSU).

In one embodiment, the third node in the present disclosure is a terminal.

In one embodiment, the third node in the present disclosure is an automobile.

In one embodiment, the third node in the present disclosure is a vehicle.

In one embodiment, the third node in the present disclosure is an RSU.

In one embodiment, the first node in the present disclosure transmits the second-type reference signal, and the third node in the present disclosure receives the second-type reference signal.

In one embodiment, the operation in the present disclosure is transmitting; the first node in the present disclosure uses a same spatial domain filter for transmitting the second-type reference signal and the first signal.

In one embodiment, the operation in the present disclosure is transmitting; the first node in the present disclosure uses a same antenna panel for transmitting the second-type reference signal and the first signal.

In one embodiment, the operation in the present disclosure is transmitting; a target receiver for the second-type reference signal does not include a transmitter for the K first-type reference signals.

In one embodiment, the execution in the present disclosure is receiving; the third node in the present disclosure uses a same spatial domain filter for receiving the second-type reference signal and the first signal.

In one embodiment, the execution in the present disclosure is receiving; the third node in the present disclosure uses a same antenna panel for receiving the second-type reference signal and the first signal.

In one embodiment, the first signal is transmitted on a sidelink physical layer data channel (i.e., a sidelink channel capable of bearing physical layer data).

In one embodiment, the first signal is transmitted on a Physical Sidelink Shared CHannel (PSSCH).

In one embodiment, the steps marked by the box F53 in FIG. 5 exist; a second reference power value is used by the first node U2 to determine the first power value, the second reference power value being linear with a second pathloss; a measurement on the second-type reference signal is used to determine the second pathloss.

In one embodiment, steps marked by the box F53 and the box F54 in FIG. 5 exist; the first information block indicates a first channel quality, a measurement on the second-type reference signal is used by the third node U3 to determine the first channel quality, the first channel quality being used by the first node U2 to determine the second pathloss.

In one embodiment, the first information block is transmitted on a PSSCH.

In one embodiment, the first information block is transmitted on a Physical Sidelink Control Channel (PSCCH).

In one embodiment, the first information block is transmitted on a Physical Sidelink Feedback Channel (PSFCH).

In one embodiment, the steps marked by the box F51 in FIG. 5 exist; the second information block indicates configuration information for each of the K first-type reference signals.

In one embodiment, the second information block is transmitted in a Physical Downlink Shared CHannel (PDSCH).

In one embodiment, the second information block comprises P1 information sub-blocks, P1 being a positive integer greater than 1; the P1 information sub-blocks are respectively transmitted on P1 PDSCHs.

In one embodiment, the steps marked by the box F55 in FIG. 5 exist; the method in a first node for wireless communications comprises:

transmitting the first signaling; and herein, the first signaling comprises scheduling information for the first signal; The scheduling information for the first signal comprises one or more of time-domain resources occupied, frequency-domain resources occupied, a Modulation and Coding Scheme (MCS, DMRS configuration information, a Hybrid Automatic Repeat reQuest (HARQ) process number, a Redundancy Version (RV) or a New Data Indicator (NDI).

In one embodiment, the first signaling comprises one or more fields in Sidelink Control Information (SCI).

In one embodiment, the first signaling is transmitted in the sidelink.

In one embodiment, the first signaling is transmitted via a PC5 interface.

In one embodiment, the first signaling is transmitted on a PSCCH.

In one embodiment, the first signaling indicates priority of the first signal.

In one embodiment, the steps marked by the box F52 in FIG. 5 exist; the method in a first node for wireless communications comprises:
transmitting the third information block; herein, the third information block indicates the first reference signal and the first index.

In one embodiment, the third information block is carried by a physical layer signaling.

In one embodiment, the third information block is borne by a Medium Access Control layer Control Element (MAC CE) signaling.

In one embodiment, the third information block is transmitted in an uplink.

In one embodiment, the third information block is transmitted via a Uu interface.

In one embodiment, the third information block indicates that the first index is used to determine a Spatial domain receive filter for the first reference signal.

In one embodiment, the third information block indicates that an antenna panel used for receiving the first reference signal is identified by the first index.

In one embodiment, the third information block indicates that an antenna group used for receiving the first reference signal is identified by the first index.

In one embodiment, the third signaling is transmitted on a Physical Uplink Control Channel (PUCCH).

In one embodiment, measurements on the K first-type reference signals are respectively used to determine K pathlosses, the K pathlosses being used to determine the transmission antenna port/transmission antenna ports for the first signal.

In one embodiment, the K pathlosses are used to determine the first index.

In one embodiment, the K pathlosses are used to determine the first reference signal out of the K first-type reference signals.

In one embodiment, the first index is used to determine a transmission antenna port for the first signal.

In one embodiment, the first reference signal is used to determine a transmission antenna port for the first signal.

In one embodiment, the first index is an index of the first pathloss among the K pathlosses.

In one embodiment, the first index is an index of the first reference signal among the K first-type reference signals.

In one embodiment, the first index is an identifier for the first reference signal.

In one embodiment, any of the K pathlosses is equal to a transmit power for a corresponding first-type reference signal, which is measured in dBm, being subtracted by an RSRP for the corresponding first-type reference signal, which is also measured in dBm.

In one embodiment, the first pathloss is a maximum one of the K pathlosses.

In one embodiment, the first pathloss is a minimum one of the K pathlosses.

In one embodiment, the K pathlosses are respectively used to determine K reference powers, where the first reference power is a reference power corresponding to the first pathloss among the K reference powers.

In one subembodiment, the way of calculating any given reference power among the K reference powers is almost same as that for the first reference power, except for that the first pathloss is replaced by a given pathloss, where the given pathloss is one of the K pathlosses that corresponds to the given reference power.

In one subembodiment, the first reference power is a maximum reference power of the K reference powers.

In one subembodiment, the first reference power is a minimum reference power of the K reference powers.

In one subembodiment, the first reference power is a maximum reference power of the K reference powers which is no greater than a first threshold; the first threshold is a positive real number.

In one subembodiment, the first reference power is a minimum reference power of the K reference powers which is no less than a first threshold; the first threshold is a positive real number.

In one subembodiment, K1 reference powers are made up of all reference powers no greater than a first threshold among the K reference powers, K1 being a positive integer greater than 1; the first reference power is one of the K1 reference powers; a third-type reference signal is used to determine the first reference power out of the K1 reference powers; the first threshold is a positive real number.

In one subembodiment, K1 reference powers are made up of all reference powers no less than a first threshold among the K reference powers, K1 being a positive integer greater than 1; the first reference power is one of the K1 reference powers; a third-type reference signal is used to determine the first reference power out of the K1 reference powers; the first threshold is a positive real number.

In one subembodiment, a transmitter for the third-type reference signal is the first node, and a target receiver for the third-type reference signal is a target receiver for the first signal.

In one subembodiment, a transmitter for the third-type reference signal is a target receiver for the first signal, and a target receiver for the third-type reference signal is the first node.

In one subembodiment, the third-type reference signal is the second-type reference signal.

In one subembodiment, the third-type reference signal comprises a DMRS.

In one subembodiment, the third-type reference signal comprises a CSI-RS.

In one subembodiment, the third-type reference signal comprises an SL CSI-RS.

In one subembodiment, a measurement on the third-type reference signal is used to determine the first reference signal.

In one subembodiment, K1 spatial domain filters are respectively spatial domain filters for the first node for receiving K1 first-type reference signals, the K1 first-type reference signals being first-type reference signals respectively corresponding to the K1 reference powers among the K first-type reference signals; a first filter is a filter for the first node for receiving the first reference signal, an RSRP obtained by the first node using the first filter to receive the third-type reference signal is no smaller than an RSRP obtained by the first node using any of the K1 filters other than the first filter to receive the third-type reference signal.

In one subembodiment, a QCL relation of the second-type reference signal is used to determine the first reference signal.

In one subembodiment, K1 first-type reference signals are respectively first-type reference signals corresponding to the K1 reference powers among the K first-type reference signals, and the first reference signal is one and only first-type reference signal among the K1 first-type reference signals that is QCL with the second-type reference signal.

In one embodiment, the first threshold is RRC configured.

In one embodiment, the first threshold is default.

In one embodiment, values of the K reference powers are used to determine the first threshold.

In one embodiment, a second threshold is used to determine K2 reference powers from the K reference powers, K2 being a positive integer less than K; the first threshold is a maximum value among the K2 reference powers.

In one embodiment, a second threshold is used to determine K2 reference powers from the K reference powers, K2 being a positive integer less than K; the first threshold is a minimum value among the K2 reference powers.

In one embodiment, the second threshold is a positive real number less than 1.

In one embodiment, the K2 is a largest positive integer of which the ratio to the K is no greater than a second threshold.

In one embodiment, the K2 is a smallest positive integer of which the ratio to the K is no smaller than a second threshold.

In one embodiment, the K2 reference powers are K2 maximum reference powers among the K reference powers.

In one embodiment, the K2 reference powers are K2 minimum reference powers among the K reference powers.

In one embodiment, the first node determines the first reference power out of the K reference powers to determine the first reference signal.

In one embodiment, the first node determines the first pathloss out of the K pathlosses to determine the first reference signal.

In one embodiment, the first reference power is no greater than a first threshold; the first threshold is a positive real number.

In one embodiment, the K pathlosses are used to determine a transmission antenna port for the first signal.

Embodiment 6

Embodiment 6 illustrates a flowchart of wireless transmission according to one embodiment of the present disclosure, as shown in FIG. 6. In FIG. 6, a second node U4, a first node U5 and a third node U6 are communication nodes that mutually transmit through air interfaces. In FIG. 6, steps marked by the box F61 and the box F62 are optional, respectively.

The second node U4 transmits a second information block in step S6401; and transmits K first-type reference signals in step S641.

The first node U5 receives a second information block in step S6501; receives K first-type reference signals in step S651; and receives a second-type reference signal in step S6502; and transmits a first signal in step S652.

The third node U6 transmits a second-type reference signal in step S6601; and receives a first signal in step S661.

In one embodiment, the first node in the present disclosure receives the second-type reference signal; the third node in the present disclosure transmits the second-type reference signal.

In one embodiment, the steps marked by the box F62 in FIG. 6 exist; a second reference power value is used by the first node U5 to determine the first power value, the second reference power value being linear with a second pathloss; a measurement on the second-type reference signal is used by the first node U5 to determine the second pathloss.

In one embodiment, the operation in the present disclosure is receiving; the first node in the present disclosure uses a same spatial domain filter for receiving the second-type reference signal and transmitting the first signal.

In one embodiment, the operation in the present disclosure is receiving; the first node in the present disclosure uses a same antenna panel for receiving the second-type reference signal and transmitting the first signal.

In one embodiment, the execution in the present disclosure is transmitting; the third node in the present disclosure uses a same spatial domain filter for transmitting the second-type reference signal and receiving the first signal.

In one embodiment, the execution in the present disclosure is transmitting; the third node in the present disclosure uses a same antenna panel for transmitting the second-type reference signal and receiving the first signal.

Embodiment 7

Embodiment 7 illustrates a schematic diagram of a first reference power value according to one embodiment of the present disclosure; as shown in FIG. 7. In Embodiment 7, the first reference power value is linear with the first pathloss in the present disclosure, a measurement on the first reference signal in the present disclosure is used to determine the first pathloss, a linear coefficient between the first reference power value and the first pathloss being a first coefficient. The symbol "∝" in FIG. 7 represents a linear correlation.

In one embodiment, the first reference power value is measured in Watts.

In one embodiment, the first reference power value is measured in dBm.

In one embodiment, the first pathloss is measured in dB.

In one embodiment, the first pathloss is equal to a transmit power for the first reference signal being subtracted by a Reference Signal Received Power (RSRP) for the first reference signal.

In one embodiment, the first pathloss is equal to a transmit power for the first reference signal, which is measured in dBm, being subtracted by an RSRP for the first reference signal, which is measured in dBm.

In one embodiment, the first pathloss is equal to a transmit power for the first reference signal being subtracted by an RSRP obtained by the first node's receiving of the first reference signal using a first spatial domain filter, the first spatial domain filter being a spatial domain filter for the first node for transmitting the first signal in the present disclosure.

In one embodiment, the first pathloss is equal to a transmit power for the first reference signal being subtracted by an RSRP obtained by the first node's receiving of the first reference signal using a first antenna group, the first antenna group being an antenna port for the first node for transmitting the first signal in the present disclosure, where the first antenna group comprises a positive integer number of antenna(s).

In one embodiment, the first pathloss is equal to a transmit power for the first reference signal being subtracted by an RSRP obtained by the first node's receiving of the first reference signal using a first antenna panel, the first antenna panel being an antenna panel for the first node for transmitting the first signal in the present disclosure, where the first antenna panel comprises a positive integer number of antenna(s).

In one embodiment, the first coefficient is a non-negative real number no greater than 1.

In one embodiment, the first coefficient is configured by a higher layer parameter.

In one embodiment, the first coefficient is pre-configured.

In one embodiment, the first coefficient is a(j) used for uplink power control.

In one embodiment, the first coefficient is a(j) used for sidelink power control.

In one embodiment, the first reference power value is linear with a first component, with a linear coefficient between the first reference power value and the first component being 1; the first component is a power reference.

In one subembodiment, the first component is $P_0(j)$ used for uplink power control.

In one subembodiment, the first component is $P_0(j)$ used for sidelink power control.

In one subembodiment, the first component is configured by a higher layer parameter.

In one subembodiment, the first component is pre-configured.

In one embodiment, the first reference power value is linear with a second component, with a linear coefficient between the first reference power value and the second component being 1; the second component is related to a bandwidth allocated to the first signal.

In one subembodiment, the second component is related to a bandwidth in Resource Blocks (RBs) allocated to the first signal.

In one embodiment, the first reference power value is linear with a third component, with a linear coefficient between the first reference power value and the third component being 1, the third component being related to a MCS of the first signal.

In one embodiment, the first reference power value is linear with a fourth component, with a linear coefficient between the first reference power value and the fourth component being 1, the fourth component being a power control adjusted status.

In one embodiment, the first reference power value is respectively linear with the first pathloss, the first component, the second component, the third component and the fourth component. A linear coefficient between the first reference power value and the first pathloss is the first coefficient; linear coefficients between the first reference power value and, respectively, the first component, the second component, the third component as well as the fourth component are 1.

In one embodiment, the first reference power value is respectively linear with the first pathloss, the first component and the second component. A linear coefficient between the first reference power value and the first pathloss is the first coefficient; linear coefficients between the first reference power value and, respectively, the first component, and the second component are 1.

Embodiment 8

Embodiment 8 illustrates a schematic diagram of a first index according to one embodiment of the present disclosure; as shown in FIG. 8. In Embodiment 8, the first index is related to a transmission antenna port for the first signal.

In one embodiment, the phrase that the first index is related to a transmission antenna port for the first signal comprises: a transmission antenna port for the first signal being used to determine the first index.

In one embodiment, the phrase that the first index is related to a transmission antenna port for the first signal comprises: an antenna panel used for transmitting the first signal being used to determine the first index.

In one embodiment, the phrase that the first index is related to a transmission antenna port for the first signal comprises: an antenna group used for transmitting the first signal being used to determine the first index.

In one embodiment, the phrase that the first index is related to a transmission antenna port for the first signal comprises: a spatial domain transmission filter for the first signal being used to determine the first index.

In one embodiment, the phrase that the first index is related to a transmission antenna port for the first signal comprises: a TCI state of the first signal being used to determine the first index.

In one embodiment, the phrase that the first index is related to a transmission antenna port for the first signal comprises: the first index being an identifier for an antenna panel used for transmitting the first signal.

In one embodiment, the phrase that the first index is related to a transmission antenna port for the first signal comprises: the first index being an identifier for an antenna group used for transmitting the first signal.

In one embodiment, the phrase that the first index is related to a transmission antenna port for the first signal comprises: the first index being an identifier for a TCI state for the first signal.

In one embodiment, the phrase that the first index is related to a transmission antenna port for the first signal comprises: the first node using a same spatial domain filter for transmitting a first uplink reference signal and the first signal, the first index indicating the first uplink reference signal.

In one embodiment, the first index is an identifier for the first uplink reference signal.

In one embodiment, the first uplink reference signal comprises an SRS.

In one embodiment, the first uplink reference signal is the second reference signal in the present disclosure.

In one embodiment, the first index explicitly indicates the first uplink reference signal.

In one embodiment, the first index implicitly indicates the first uplink reference signal.

In one embodiment, the phrase that the first index is related to a transmission antenna port for the first signal comprises: the first node using a same spatial domain filter for receiving a first downlink reference signal and transmitting the first signal, the first index indicating the first downlink reference signal.

In one embodiment, the first index is an identifier for the first downlink reference signal.

In one embodiment, the first downlink reference signal comprises a CSI-RS.

In one embodiment, the first downlink reference signal comprises an SSB.

In one embodiment, the first downlink reference signal is the first reference signal in the present disclosure.

In one embodiment, the first index explicitly indicates the first downlink reference signal.

In one embodiment, the first index implicitly indicates the first downlink reference signal.

In one embodiment, the phrase that the first index is related to a transmission antenna port for the first signal comprises: the first node using a first antenna panel for transmitting the first signal, the first index indicating the first antenna panel.

In one embodiment, the first index explicitly indicates the first antenna panel.

In one embodiment, the first index implicitly indicates the first antenna panel.

In one embodiment, the phrase that the first index is related to a transmission antenna port for the first signal comprises: the first node using a first antenna group to transmit the first signal, the first index indicating the first antenna group.

In one embodiment, the first index explicitly indicates the first antenna group.

In one embodiment, the first index implicitly indicates the first antenna group.

In one embodiment, the phrase that the first index is related to a transmission antenna port for the first signal comprises: the first node using a same antenna panel for transmitting a first reference signal group and the first signal, the first reference signal group comprising a positive integer number of uplink reference signal(s); the first index indicates the first reference signal group.

In one embodiment, the phrase that the first index is related to a transmission antenna port for the first signal comprises: the first node using a same antenna panel for receiving a first reference signal group and transmitting the first signal, the first reference signal group comprising a positive integer number of downlink reference signal(s); the first index indicates the first reference signal group.

In one embodiment, the phrase that the first index is related to a transmission antenna port for the first signal comprises: the first index being used to determine a transmission antenna port for the first signal.

In one embodiment, the phrase that the first index is related to a transmission antenna port for the first signal comprises: the first index being used to determine an antenna used for transmitting the first signal.

In one embodiment, the phrase that the first index is related to a transmission antenna port for the first signal comprises: the first index being used to determine an antenna panel used for transmitting the first signal.

In one embodiment, the phrase that the first index is related to a transmission antenna port for the first signal comprises: the first index being used to determine an antenna group used for transmitting the first signal.

In one embodiment, the phrase that the first index is related to a transmission antenna port for the first signal comprises: the first index being used to determine at least one transmission antenna port for the first signal.

In one embodiment, the phrase that the first index is related to a transmission antenna port for the first signal comprises: the first index being used to determine all transmission antenna ports for the first signal.

In one embodiment, the phrase that the first index is related to a transmission antenna port for the first signal comprises: the first index being used to determine a spatial domain transmission filter for the first signal.

In one embodiment, the phrase that the first index is related to a transmission antenna port for the first signal comprises: the first index being used to determine a precoding matrix for the first signal.

In one embodiment, the phrase that the first index is related to a transmission antenna port for the first signal comprises: the first index indicating a TCI state of the first signal.

In one embodiment, from a channel which a radio signal transmitted from one antenna port goes through one can infer a channel which another radio signal transmitted from the antenna port goes through.

In one embodiment, from a channel which a radio signal transmitted from one antenna port goes through one cannot infer a channel which a radio signal transmitted from another antenna port goes through.

In one embodiment, the channel comprises one or more of {a Channel Impulse Response (CIR), a Precoding Matrix Indicator (PMI), a Channel Quality Indicator (CQI), a Rank Indicator (RI)}.

In one embodiment, the transmission antenna port for the first signal is a transmission antenna port for DMRS of a PSSCH bearing the first signal.

In one embodiment, the transmission antenna port for the first signal is a transmission antenna port for DMRS corresponding to the first signal.

In one embodiment, the first signal is transmitted on a first PSSCH, a first DMRS being a DMRS of the first PSSCH; a first PSSCH symbol is a symbol of the first PSSCH, a first DMRS symbol is a symbol of the first DMRS, the first PSSCH symbol and the first DMRS symbol being transmitted by a same antenna port; when and only when the first PSSCH symbol and the first DMRS symbol are located in a same slot and a same Physical Resource Group (PRG) can a channel that the first DMRS symbol goes through be used to infer a channel that the first PSSCH symbol goes through.

In one embodiment, a first DMRS is a DMRS corresponding to the first signal; a first symbol is a symbol of the first signal, a first DMRS symbol is a symbol of the first DMRS, the first symbol and the first DMRS symbol being transmitted by a same antenna port; when and only when the first symbol and the first DMRS symbol are in a same slot and a same PRG can a channel that the first DMRS symbol goes through be used to infer a channel that the first symbol goes through.

In one embodiment, the symbol is a modulated symbol.

In one embodiment, the phrase that the first index is related to a transmission antenna port for the first signal comprises: the first index being used to determine a transmission antenna port for the first signal.

In one embodiment, the phrase that the first index is related to a transmission antenna port for the first signal comprises: the first index being used to determine the first reference signal, the first reference signal being used to determine a transmission antenna port for the first signal.

In one embodiment, the K first-type reference signals respectively correspond to K fourth-type reference signals, a first reference signal corresponding to a fourth antenna port among the K fourth-type reference signals, a transmission antenna port for the first signal being QCL with the fourth reference signal.

In one subembodiment, the K fourth-type reference signals comprise an SRS.

In one subembodiment, the K fourth-type reference signals comprise a CSI-RS.

In one subembodiment, the K fourth-type reference signals comprise an SL CSI-RS.

In one subembodiment, the corresponding relationship between the K first-type reference signals and the K fourth-type reference signals is configured by an RRC signaling.

In one embodiment, the first node uses a same spatial domain filter to receive the first reference signal and transmit the first signal.

In one embodiment, the first node uses a same antenna panel to receive the first reference signal and transmit the first signal.

In one embodiment, the first node uses a same antenna group to receive the first reference signal and transmit the first signal.

Embodiment 9

Embodiment 9 illustrates a schematic diagram of a second reference power value according to one embodiment of the present disclosure; as shown in FIG. 9. In FIG. 9, the second reference power value is linear with the second pathloss in the present disclosure; a measurement on the second-type reference signal in the present disclosure is used to determine the second pathloss, with a linear coefficient between the second reference power value and the second pathloss being a second coefficient. The symbol "$\propto$" in FIG. 9 represents a linear correlation.

In one embodiment, the second-type reference signal is a sidelink reference signal.

In one embodiment, the second-type reference signal comprises a CSI-RS.

In one embodiment, the second-type reference signal comprises a SideLink (SL) CSI-RS.

In one embodiment, the second-type reference signal comprises a DMRS.

In one embodiment, the second-type reference signal comprises an SL DMRS.

In one embodiment, the second-type reference signal comprises an SRS.

In one embodiment, the second-type reference signal comprises a Synchronization Signal (SS).

In one embodiment, the second-type reference signal comprises an SL SS.

In one embodiment, the second-type reference signal is transmitted in a sidelink.

In one embodiment, the second-type reference signal is transmitted via a PC5 interface.

In one embodiment, the second-type reference signal is transmitted by unicast.

In one embodiment, the second-type reference signal is transmitted by groupcast.

In one embodiment, the second-type reference signal is transmitted by broadcast.

In one embodiment, the K first-type reference signals in the present disclosure are transmitted on a same carrier as the second-type reference signal.

In one embodiment, the second reference power value is measured in Watts.

In one embodiment, the second reference power value is measured in dBm.

In one embodiment, the second pathloss is measured in dB.

In one embodiment, the second pathloss is equal to a transmit power for the second-type reference signal being subtracted by an RSRP for the second-type reference signal.

In one embodiment, the second pathloss is equal to a transmit power for the second-type reference signal, which is measured in dBm, being subtracted by an RSRP for the second-type reference signal, which is measured in dBm.

In one embodiment, the second coefficient is a non-negative real number no greater than 1.

In one embodiment, the second coefficient is configured by a higher layer parameter.

In one embodiment, the second coefficient is pre-configured.

In one embodiment, the second coefficient is a(j) used for sidelink power control.

In one embodiment, the second reference power value is linear with a fifth component, with a linear coefficient between the second reference power value and the fifth component being 1; the fifth component is a power reference.

In one subembodiment, the fifth component is $P_0$ used for sidelink power control.

In one subembodiment, the fifth component is pre-configured.

In one subembodiment, the fifth component is configured by a higher layer parameter.

In one embodiment, the second reference power value is linear with a sixth component, with a linear coefficient between the second reference power value and the sixth component being 1; the sixth component is related to a bandwidth allocated to the first signal.

In one subembodiment, the sixth component is related to a bandwidth in RBs allocated to the first signal.

In one embodiment, the second reference power value is linear with a seventh component, with a linear coefficient between the second reference power value and the seventh component being 1; the seventh component is related to both a bandwidth of the first signal and a bandwidth of the first signaling in Embodiment 5.

In one subembodiment, the seventh component is related to a bandwidth in RBs allocated to the first signal and a bandwidth in RBs of the first signaling.

In one embodiment, the second reference power value is respectively linear with the second pathloss, the fifth component and the sixth component. A linear coefficient between the second reference power value and the second pathloss is the second coefficient; linear coefficients between the second reference power value and, respectively, the fifth component, and the sixth component are 1.

In one embodiment, the second reference power value is respectively linear with the second pathloss, the fifth component and the seventh component. A linear coefficient between the second reference power value and the second pathloss is the second coefficient; linear coefficients between the second reference power value and, respectively, the fifth component, and the seventh component are 1.

Embodiment 10

Embodiment 10 illustrates a schematic diagram of a first power value according to one embodiment of the present disclosure; as shown in FIG. 10. In Embodiment 10, the first power value is a minimum value of the first reference power value and a first power threshold in the present disclosure.

In one embodiment, the first power value is measured in Watts.

In one embodiment, the first power value is measured in dBm.

In one embodiment, the first power value is no greater than the first reference power value.

In one embodiment, the first power value is equal to the first reference power value.

In one embodiment, the first power value is less than the first reference power value.

In one embodiment, the first power threshold is measured in Watts.

In one embodiment, the first power threshold is measured in dBm.

In one embodiment, the first power threshold is a maximum transmit power for the first node in the uplink.

In one embodiment, the first power threshold is a maximum power available for the first node for transmitting a Physical Uplink Shared CHannel (PUSCH).

In one embodiment, the first power threshold is a maximum transmit power for the first node in the sidelink.

In one embodiment, the first power threshold is a maximum power available for the first node for transmitting a PSSCH.

Embodiment 11

Embodiment 11 illustrates a schematic diagram of a first power value according to one embodiment of the present disclosure; as shown in FIG. 11. In Embodiment 11, the first power value is a minimum value of the first reference power value and the second reference power value in the present disclosure.

In one embodiment, the first reference power value and the second reference power value are jointly used to determine the first power value.

In one embodiment, the first power value is no greater than the second reference power value.

In one embodiment, the first power value is equal to the second reference power value.

In one embodiment, the first power value is less than the second reference power value.

Embodiment 12

Embodiment 12 illustrates a schematic diagram of a first power value according to one embodiment of the present disclosure; as shown in FIG. 12. In Embodiment 12, the first power value is a minimum value of the first reference power value in the present disclosure, the second reference power value in the present disclosure and a first power threshold in the present disclosure.

Embodiment 13

Embodiment 13 illustrates a schematic diagram of a first power value according to one embodiment of the present disclosure; as shown in FIG. 13. In Embodiment 13, the first power value is a minimum value of the first reference power value in the present disclosure, the second reference power value in the present disclosure, a first power threshold and a second power threshold in the present disclosure.

In one embodiment, the second power threshold is measured in Watts.

In one embodiment, the second power threshold is measured in dBm.

In one embodiment, the second power threshold is a maximum transmit power for the first node in the sidelink.

In one embodiment, the second power threshold is a maximum power available for the first node for transmitting a PSSCH.

In one embodiment, the second power threshold is a minimum value of a third power threshold and a fourth power threshold.

In one embodiment, the first power threshold is a maximum transmit power for the first node in the uplink, while the second power threshold is a maximum power for the first node in the sidelink.

In one embodiment, the first power threshold is a maximum power available for the first node to be used for transmitting a PUSCH, while the second power threshold is a maximum power available for the first node to be used for transmitting a PSSCH.

Embodiment 14

Embodiment 14 illustrates a schematic diagram of a first power value according to one embodiment of the present disclosure; as shown in FIG. 14. In Embodiment 14, the first power value is a minimum value of the first reference power value, a third reference power value and a first power threshold in the present disclosure; the third reference power value is equal to a sum of a fourth reference power value and a fifth reference power value; the fourth reference power value is a minimum value of the second reference power value and the second power threshold in the present disclosure, and the fifth reference power value is related to a bandwidth of the first signal in the present disclosure as well as a bandwidth of the first signaling in Embodiment 5.

In one embodiment, the fifth reference power value decreases with the increase of the bandwidth of the first signaling.

Embodiment 15

Embodiment 15 illustrates a schematic diagram of a first information block according to one embodiment of the present disclosure; as shown in FIG. 15. In Embodiment 15, the first information block indicates the first channel quality in the present disclosure, a measurement on the second-type reference signal is used to determine the first channel quality, the first channel quality being used to determine the second pathloss in the present disclosure.

In one embodiment, the first information block is borne by a physical layer signaling.

In one embodiment, the first information block is borne by a MAC CE signaling.

In one embodiment, the first information block is borne by a higher layer signaling.

In one embodiment, a transmitter for the first information block is different from a transmitter for the K first-type reference signals.

In one embodiment, the first information block comprises a positive integer number of information bit(s).

In one embodiment, the first information block is transmitted in the sidelink.

In one embodiment, the first information block is transmitted via a PC5 interface.

In one embodiment, the first information block is transmitted by unicast.

In one embodiment, the first information block is transmitted by groupcast.

In one embodiment, the first information block is transmitted by broadcast.

In one embodiment, the first information block explicitly indicates the first channel quality.

In one embodiment, the first information block implicitly indicates the first channel quality.

In one embodiment, the first channel quality comprises an RSRP for the second-type reference signal.

In one embodiment, the first channel quality comprises an L1-RSRP for the second-type reference signal.

In one embodiment, the first channel quality comprises an L3-RSRP for the second-type reference signal.

In one embodiment, the first channel quality comprises a CQI.

In one embodiment, the first channel quality is measured in dBm.

In one embodiment, the second pathloss is equal to a transmit power for the second-type reference signal, which is measured in dBm, being subtracted by the first channel quality.

In one embodiment, the second pathloss is equal to a transmit power for the second-type reference signal, which is measured in dBm, being subtracted by an average channel quality, the average channel quality being a linear average value of P channel qualities converted into dBm, where P is a positive integer greater than 1, and the first channel quality is one of the P channel qualities.

In one embodiment, the second pathloss is equal to a linear average value of P pathlosses converted into dBm, where P is a positive integer greater than 1, and one of the P pathlosses is equal to a transmit power for the second-type reference signal being subtracted by the first channel quality.

Embodiment 16

Embodiment 16 illustrates a schematic diagram of a first reference signal and a first index being associated according to one embodiment of the present disclosure; as shown in FIG. 16.

In one embodiment, the phrase of the first reference signal and the first index being associated comprises: the first index being used to determine Spatial Rx Parameters for the first reference signal.

In one embodiment, the phrase of the first reference signal and the first index being associated comprises: the first index being used to determine a Spatial domain receive filter for the first reference signal.

In one embodiment, the phrase of the first reference signal and the first index being associated comprises: the first index being used to determine an antenna group used for receiving the first reference signal.

In one embodiment, the phrase of the first reference signal and the first index being associated comprises: the first index being used to determine an antenna panel used for receiving the first reference signal.

In one embodiment, the phrase of the first reference signal and the first index being associated comprises: the first index indicating a first uplink reference signal, the first node using a same spatial domain filter to transmit the first uplink reference signal and receive the first reference signal.

In one subembodiment, the first uplink reference signal comprises an SRS.

In one embodiment, the phrase of the first reference signal and the first index being associated comprises: the first index indicating a first downlink reference signal, the first node using a same spatial domain filter to receive the first downlink reference signal and the first reference signal.

In one subembodiment, the first downlink reference signal comprises a CSI-RS.

In one subembodiment, the first downlink reference signal comprises an SSB.

In one embodiment, the phrase of the first reference signal and the first index being associated comprises: the first index indicating a first antenna panel, the first node using the first antenna panel to receive the first reference signal.

In one embodiment, the phrase of the first reference signal and the first index being associated comprises: the first index indicating a first antenna group, the first node using the first antenna group to receive the first reference signal.

In one embodiment, the phrase of the first reference signal and the first index being associated comprises: the first index being an identifier for the first reference signal.

In one embodiment, the phrase of the first reference signal and the first index being associated comprises: the first index being an identifier for a reference signal resource corresponding to the first reference signal.

In one embodiment, the phrase of the first reference signal and the first index being associated comprises: the first index being an identifier for a reference signal resource group corresponding to the first reference signal.

In one embodiment, Q reference signals are respectively associated with the first index, where Q is a positive integer greater than 1; the first reference signal is one of the Q reference signals.

In one subembodiment, the first node uses the same Spatial Rx Parameters to receive the Q reference signals.

In one subembodiment, the first node uses a same Spatial domain filter to receive the Q reference signals.

In one subembodiment, the first node uses a same antenna panel to receive the Q reference signals.

In one subembodiment, the first node uses a same antenna group to receive the Q reference signals.

In one embodiment, the third information block in Embodiment 5 indicates that the first reference signal is associated with the first index.

Embodiment 17

Embodiment 17 illustrates a schematic diagram of relations among a first index, a second reference signal and a first reference signal according to one embodiment of the present disclosure. as shown in FIG. 17. In Embodiment 17, the first index indicates the second reference signal, the second reference signal being associated with the first reference signal.

In one embodiment, the first index explicitly indicates the second reference signal.

In one embodiment, the first index implicitly indicates the second reference signal.

In one embodiment, the first index is an identifier for the second reference signal.

In one embodiment, the first index is an identifier for a reference signal resource corresponding to the second reference signal.

In one embodiment, the first index is an identifier for a reference signal resource group corresponding to the second reference signal.

In one embodiment, the second reference signal is an uplink reference signal.

In one embodiment, the second reference signal comprises an SRS.

In one embodiment, a transmitter for the second reference signal is the first node.

In one embodiment, the second reference signal is transmitted in an uplink.

In one embodiment, the second reference signal is transmitted via a Uu interface.

In one embodiment, the phrase of the second reference signal being associated with the first reference signal comprises: a measurement on the first reference signal being used to determine a spatial domain transmission filter for the second reference signal.

In one embodiment, the phrase of the second reference signal being associated with the first reference signal comprises: the first node using a same spatial domain filter to receive the first reference signal and transmit the second reference signal.

In one embodiment, the first signal and the second reference signal in the present disclosure are transmitted by a same antenna port.

In one embodiment, any transmission antenna port for the first signal in the present disclosure is a transmission antenna port for the second reference signal.

In one embodiment, a transmission antenna port for the first signal in the present disclosure is QCL with a transmission antenna port for the second reference signal.

In one embodiment, any transmission antenna port for the first signal in the present disclosure is QCL with a transmission antenna port for the second reference signal.

In one embodiment, the first node uses a same spatial domain transmission filter to transmit the first signal and the second reference signal in the present disclosure.

In one embodiment, a transmission antenna port for the first signal in the present disclosure is obtained by applying a first precoding matrix in a transmission antenna port for the second reference signal.

In one embodiment, the first node uses a same antenna panel to transmit the first signal and the second reference signal in the present disclosure.

In one embodiment, the first node uses a same antenna group to transmit the first signal and the second reference signal in the present disclosure.

In one embodiment, the phrase of the second reference signal being associated with the first reference signal comprises: the second reference signal comprising an SRS, the first index comprising an SRI corresponding to the second reference signal, a fifth information block indicating the first reference signal and the first index; The fifth information block indicates that the first reference signal is a reference signal used for pathloss estimation that corresponds to the SRI corresponding to the second reference signal.

In one subembodiment, the fifth information block comprises information in all or partial fields in an IE.

In one subembodiment, the fifth information block comprises information in all or partial fields in a PUSCH-PowerControl IE.

In one subembodiment, the fifth information block comprises information in a sri-PUSCH-MappingToAddModList field in a PUSCH-PowerControl IE.

In one embodiment, the phrase of the second reference signal being associated with the first reference signal comprises: a measurement on the first reference signal being used to determine a pathloss used in calculating a transmit power for a given signal, the given signal being a radio signal transmitted by the first node on a Uu interface, which is QCL with the second reference signal.

Embodiment 18

Embodiment 18 illustrates a schematic diagram of a second information block according to one embodiment of the present disclosure; as shown in FIG. 18. In Embodiment 18, the second information block indicates configuration information for each of the K first-type reference signals in the present disclosure.

In one embodiment, the second information block is borne by a higher layer signaling.

In one embodiment, the second information block is borne by an RRC signaling.

In one embodiment, the second information block is borne by a MAC CE signaling.

In one embodiment, the second information block comprises P1 information sub-blocks, P1 being a positive integer greater than 1.

In one subembodiment, the P1 information sub-blocks are respectively borne by P1 RRC signalings.

In one subembodiment, the P1 information sub-blocks are respectively borne by P1 MAC CE signalings.

In one embodiment, the second information block comprises information in all or partial fields in an Information Element (IE).

In one embodiment, the second information block is transmitted in a downlink.

In one embodiment, the second information block is transmitted via a Uu interface.

In one embodiment, a transmitter for the second information block is the same as a transmitter for the K first-type reference signals.

In one embodiment, the configuration information for any first-type reference signal among the K first-type reference signals comprises: one or more of occupied time-domain resources, occupied frequency-domain resources, occupied code-domain resources, an RS sequence, a mapping mode, a cyclic shift, an Orthogonal Cover Code (OCC), a frequency-domain spread sequence or a time-domain spread sequence.

In one embodiment, the second information block indicates configuration information for each of K0 first-type reference signals, any first-type reference signal of the K first-type reference signals is one of the K0 first-type reference signals, K0 being a positive integer greater than the K; a fourth information block indicates the K first-type reference signals out of the K0 first-type reference signals.

In one subembodiment, the fourth information block comprises a bitmap, the bitmap indicating whether each of the K0 first-type reference signals belongs to the K first-type reference signals.

In one subembodiment, among the K0 first-type reference signals only the K first-type reference signals can be used for pathloss estimation for V2X transmission.

In one subembodiment, the fourth information block is borne by an RRC signaling.

In one subembodiment, the fourth information block is borne by a MAC CE signaling.

Embodiment 19

Embodiment 19 illustrates a structure block diagram of a processing device used in a first node according to one embodiment of the present disclosure; as shown in FIG. 19. In FIG. 19, a processing device 1900 in a first node comprises a first receiver 1901 and a first processor 1902.

In Embodiment 19, the first receiver 1901 receives K first-type reference signals; and the first processor 1902 transmits a first signal.

In Embodiment 19, K is a positive integer greater than 1; a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/transmission antenna ports for the first signal, the first index being used to determine the first reference signal out of the K first-type reference signals; a transmitter for the K first-type reference signals is different from a target receiver for the first signal.

In one embodiment, a same spatial domain filter is used for transmitting the first signal and receiving the first reference signal.

In one embodiment, the first processor 1902 operates a second-type reference signal; herein, a second reference power value is used to determine the first power value, the second reference power value being linear with a second pathloss; a measurement on the second-type reference signal is used to determine the second pathloss; the operation is transmitting, or the operation is receiving.

In one embodiment, the first processor 1902 transmits the second-type reference signal.

In one embodiment, the first processor 1902 receives the second-type reference signal.

In one embodiment, the first processor 1902 receives a first information block; herein, the operation is transmitting; the first information block indicates a first channel quality, a measurement on the second-type reference signal is used to determine the first channel quality, the first channel quality being used to determine the second pathloss.

In one embodiment, the first reference signal is associated with the first index.

In one embodiment, the first index indicates a second reference signal, the second reference signal being associated with the first reference signal; a target receiver for the second reference signal includes a transmitter for the K first-type reference signals.

In one embodiment, the first receiver 1901 receives a second information block; herein, the second information block indicates configuration information for each of the K first-type reference signals.

In one embodiment, measurements on the K first-type reference signals are respectively used to determine K pathlosses, the K pathlosses being used to determine the transmission antenna port/transmission antenna ports for the first signal.

In one embodiment, the first node is a UE.

In one embodiment, the first node is a relay node.

In one embodiment, the first receiver 1901 comprises at least one of the antenna 452, the receiver 454, the receiving processor 456, the multi-antenna receiving processor 458, the controller/processor 459, the memory 460 or the data source 467 in Embodiment 4.

In one embodiment, the first processor 1902 comprises at least one of the antenna 452, the transmitter/receiver 454, the transmitting processor 468, the receiving processor 456, the multi-antenna transmitting processor 457, the multi-antenna receiving processor 458, the controller/processor 459, the memory 460 or the data source 467 in Embodiment 4.

Embodiment 20

Figure 20:
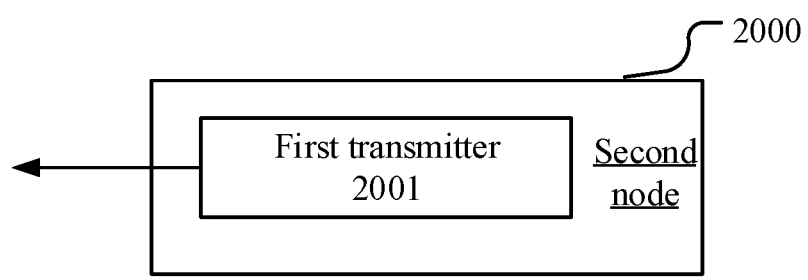
FIG. 20 illustrates a structure block diagram of a processing device used in a second node according to one embodiment of the present disclosure.

Embodiment 20 illustrates a structure block diagram of a processing device used in a second node according to one embodiment of the present disclosure; as shown in FIG. 20. In FIG. 20, a processing device 2000 in a second node comprises a first transmitter 2001.

In Embodiment 20, the first transmitter 2001 transmits K first-type reference signals.

In Embodiment 20, K is a positive integer greater than 1; a measurement on a first reference signal is used to determine a first pathloss, the first reference signal being one of the K first-type reference signals; a first index is related to a transmission antenna port/transmission antenna ports for a first signal, a target receiver for the first signal is different from the second node; a transmit power for the first signal is a first power value, a first reference power value is used to determine the first power value, the first reference power value being linear with the first pathloss; the first index is used to determine the first reference signal out of the K first-type reference signals.

In one embodiment, a same spatial domain filter is used for transmitting the first signal and receiving the first reference signal.

In one embodiment, the first reference signal is associated with the first index.

In one embodiment, the first index indicates a second reference signal, the second reference signal being associated with the first reference signal; a target receiver for the second reference signal includes the second node.

In one embodiment, the first transmitter 2001 transmits a second information block; herein, the second information block indicates configuration information for each of the K first-type reference signals.

In one embodiment, measurements on the K first-type reference signals are respectively used to determine K pathlosses, the K pathlosses being used to determine the transmission antenna port/transmission antenna ports for the first signal.

In one embodiment, the second node is a base station.

In one embodiment, the second node is a relay node.

In one embodiment, the first transmitter 2001 comprises at least one of the antenna 420, the transmitter 418, the transmitting processor 416, the multi-antenna transmitting processor 471, the controller/processor 475 or the memory 476 in Embodiment 4.

Embodiment 21

Figure 21:
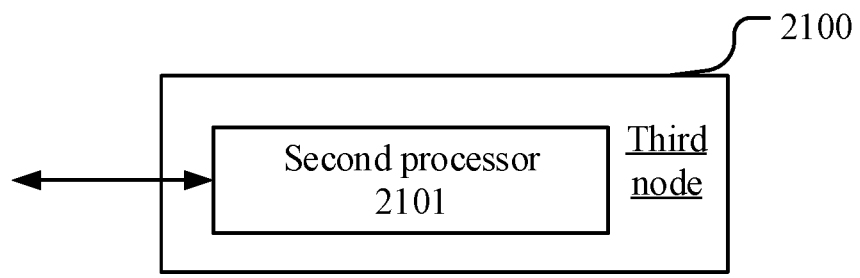
FIG. 21 illustrates a structure block diagram of a processing device used in a third node according to one embodiment of the present disclosure.

Embodiment 21 illustrates a structure block diagram of a processing device used in a third node according to one embodiment of the present disclosure; as shown in FIG. 21. In FIG. 21, a processing device 2100 in a third node comprises a second processor 2101.

In Embodiment 21, the second processor 2101 receives a first signal.

In Embodiment 21, a transmit power for the first signal is a first power value, a first reference power value is used to determine the first power value, and the first reference power value is linear with a first pathloss, a measurement on a first reference signal is used to determine the first pathloss, the first reference signal being a first-type reference signal of K first-type reference signals, K being a positive integer greater than 1; a first index is related to a transmission antenna port/transmission antenna ports for the first signal, the first index being used to determine the first reference signal out of the K first-type reference signals; a transmitter for the K first-type reference signals is different from the third node.

In one embodiment, a same spatial domain filter is used for transmitting the first signal and receiving the first reference signal.

In one embodiment, the second processor 2101 executes a second-type reference signal; herein, a second reference power value is used to determine the first power value, the second reference power value being linear with a second pathloss; a measurement on the second-type reference signal is used to determine the second pathloss; the execution is receiving, or the execution is transmitting.

In one embodiment, the second processor 2101 receives the second-type reference signal.

In one embodiment, the second processor 2101 transmits the second-type reference signal.

In one embodiment, the second processor 2101 transmits a first information block; herein, the execution is receiving; the first information block indicates a first channel quality, a measurement on the second-type reference signal is used to determine the first channel quality, the first channel quality being used to determine the second pathloss.

In one embodiment, the first reference signal is associated with the first index.

In one embodiment, the first index indicates a second reference signal, the second reference signal being associated with the first reference signal; a target receiver for the second reference signal includes a transmitter for the K first-type reference signals.

In one embodiment, measurements on the K first-type reference signals are respectively used to determine K pathlosses, the K pathlosses being used to determine the transmission antenna port/transmission antenna ports for the first signal.

In one embodiment, the third node is a UE.

In one embodiment, the third node is a relay node.

In one embodiment, the second processor 2101 comprises at least one of the antenna 420, the transmitter/receiver 418, the transmitting processor 416, the receiving processor 470, the multi-antenna transmitting processor 471, the multi-antenna receiving processor 472, the controller/processor 475 or the memory 476 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The present disclosure is not limited to any combination of hardware and software in specific forms. The UE and terminal in the present disclosure include but are not limited to unmanned aerial vehicles, communication modules on unmanned aerial vehicles, telecontrolled aircrafts, aircrafts, diminutive airplanes, mobile phones, tablet computers, notebooks, vehicle-mounted communication equipment, wireless sensor, network cards, terminals for Internet of Things (IOT), RFID terminals, NB-IOT terminals, Machine Type Communication (MTC) terminals, enhanced MTC (eMTC) terminals, data cards, low-cost mobile phones, low-cost tablet computers, etc. The base station or system device in the present disclosure includes but is not limited to macro-cellular base stations, micro-cellular base stations, home base stations, relay base station, gNB (NR node B), Transmitter Receiver Point (TRP), and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A first node for wireless communications, comprising:
    a first receiver, receiving K first-type reference signals, K being a positive integer greater than 1; and
    a first processor, transmitting a first signal;
    wherein a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/transmission antenna ports for the first signal, the first index being used to determine the first reference signal out of the K first-type reference signals; a transmitter for the K first-type reference signals is different from a target receiver for the first signal.

2. The first node according to claim 1, wherein a same spatial domain filter is used for transmitting the first signal and receiving the first reference signal.

3. The first node according to claim 1, wherein the first processor operates a second-type reference signal; wherein a second reference power value is used to determine the first power value, the second reference power value being linear with a second pathloss; a measurement on the second-type reference signal is used to determine the second pathloss; the operation is transmitting, or the operation is receiving.

4. The first node according to claim 3, wherein the first processor receives a first information block; wherein the operation is transmitting; the first information block indicates a first channel quality, a measurement on the second-type reference signal is used to determine the first channel quality, the first channel quality being used to determine the second pathloss.

5. The first node according to claim 1, wherein the first reference signal is associated with the first index.

6. The first node according to claim 1, wherein measurements on the K first-type reference signals are respectively used to determine K pathlosses, the K pathlosses being used to determine the transmission antenna port/transmission antenna ports for the first signal.

7. The first node according to claim 1, wherein the first index indicates a second reference signal, the second reference signal being associated with the first reference signal; a target receiver for the second reference signal includes a transmitter for the K first-type reference signals.

8. The first node according to claim 1, wherein the first receiver receives a second information block; wherein the second information block indicates configuration information for each of the K first-type reference signals.

9. A second node for wireless communications, comprising:
    a first transmitter, transmitting K first-type reference signals, K being a positive integer greater than 1;
    wherein a measurement on a first reference signal is used to determine a first pathloss, the first reference signal being one of the K first-type reference signals; a first index is related to a transmission antenna port/transmission antenna ports for a first signal, a target receiver for the first signal is different from the second node; a transmit power for the first signal is a first power value, a first reference power value is used to determine the first power value, the first reference power value being linear with the first pathloss; the first index is used to determine the first reference signal out of the K first-type reference signals.

10. The second node according to claim 9, wherein a same spatial domain filter is used for transmitting the first signal and receiving the first reference signal.

11. The second node according to claim 9, wherein the first reference signal is associated with the first index; or, measurements on the K first-type reference signals are respectively used to determine K pathlosses, the K pathlosses being used to determine the transmission antenna port/transmission antenna ports for the first signal.

12. The second node according to claim 9, wherein the first index indicates a second reference signal, the second reference signal being associated with the first reference signal; a target receiver for the second reference signal includes the second node.

13. The second node according to claim 9, wherein the first transmitter transmits a second information block; wherein the second information block indicates configuration information for each of the K first-type reference signals.

14. A method in a first node for wireless communications, comprising:
receiving K first-type reference signals, K being a positive integer greater than 1; and
transmitting a first signal;
wherein a transmit power for the first signal is a first power value, a first reference power value is used to determine the first power value, and the first reference power value is linear with a first pathloss, a measurement on a first reference signal is used to determine the first pathloss, the first reference signal being a first-type reference signal of the K first-type reference signals; a first index is related to a transmission antenna port/ transmission antenna ports for the first signal, the first index being used to determine the first reference signal out of the K first-type reference signals; a transmitter for the K first-type reference signals is different from a target receiver for the first signal.

15. The method according to claim 14, wherein a same spatial domain filter is used for transmitting the first signal and receiving the first reference signal.

16. The method according to claim 14, comprising:
operating a second-type reference signal;
wherein a second reference power value is used to determine the first power value, the second reference power value being linear with a second pathloss; a measurement on the second-type reference signal is used to determine the second pathloss; the operation is transmitting, or the operation is receiving.

17. The method according to claim 16, comprising:
receiving a first information block;
wherein the operation is transmitting; the first information block indicates a first channel quality, a measurement on the second-type reference signal is used to determine the first channel quality, the first channel quality being used to determine the second pathloss.

18. The method according to claim 14, wherein the first reference signal is associated with the first index; or, measurements on the K first-type reference signals are respectively used to determine K pathlosses, the K pathlosses being used to determine the transmission antenna port/ transmission antenna ports for the first signal.

19. The method according to claim 14, wherein the first index indicates a second reference signal, the second reference signal being associated with the first reference signal; a target receiver for the second reference signal includes a transmitter for the K first-type reference signals.

20. The method according to claim 14, comprising:
receiving a second information block;
wherein the second information block indicates configuration information for each of the K first-type reference signals.

\* \* \* \* \*